US012717331B2

(12) United States Patent
Panthri

(10) Patent No.: US 12,717,331 B2
(45) Date of Patent: Aug. 25, 2026

(54) HITCHLESS TOWING SYSTEM FOR PREDICTING AND COMPENSATING FOR AN INTERVENING OBSTACLE

(71) Applicant: TOYOTA MOTOR ENGINEERING & MANUFACTURING NORTH AMERICA, INC., Plano, TX (US)

(72) Inventor: Shaurya Panthri, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 276 days.

(21) Appl. No.: 18/513,996

(22) Filed: Nov. 20, 2023

(65) Prior Publication Data

US 2025/0164993 A1 May 22, 2025

(51) Int. Cl.
*G05D 1/00* (2024.01)

(52) U.S. Cl.
CPC ......... *G05D 1/0289* (2013.01); *G05D 1/0293* (2013.01)

(58) Field of Classification Search
None
See application file for complete search history.

(56) References Cited

U.S. PATENT DOCUMENTS 9,983,591 B2 5/2018 Micks
10,252,704 B2 * 4/2019 Murakoshi ......... B62D 15/0285
11,417,218 B2 8/2022 Bang
2021/0072767 A1 * 3/2021 Bryant .................. G06Q 10/08
2021/0216082 A1 7/2021 Amla
2022/0126864 A1 * 4/2022 Moustafa .......... B60W 60/0013
2022/0279699 A1 * 9/2022 Mazzarolo ............. A01G 17/02
2023/0073151 A1 3/2023 Ucar
2024/0017720 A1 * 1/2024 Johnson ................ B60W 30/09
2024/0140425 A1 * 5/2024 Ferone .................. G05D 1/695
2024/0151547 A1 * 5/2024 Stout, II ................ B60D 1/249
2024/0359742 A1 * 10/2024 Sato ...................... B62D 13/00

OTHER PUBLICATIONS

Ramezanpour Nargesi, "A Comprehensive Behavioral Study on Lane Changing Maneuvers," Ph.D. thesis, Department of Civil Engineering, The University of Texas at Arlington, May 2019, 152 pages (http://hdl.handle.net/10106/29895).

* cited by examiner

*Primary Examiner* — Hunter B Lonsberry
*Assistant Examiner* — Robert L Pinkerton
(74) *Attorney, Agent, or Firm* — SHEPPARD, MULLIN, RICHTER & HAMPTON LLP; Daniel N. Yannuzzi

(57) ABSTRACT

A hitchless towing configuration comprises a follow vehicle following a lead vehicle without a physical connection between the lead vehicle and the follow vehicle. Data received from at least one sensor of the lead vehicle or the follow vehicle is evaluated to determine an object is performing an action to move into the empty space between the lead vehicle and the follow vehicle. The lead vehicle or the follow vehicle is caused to perform a countermeasure to prevent the object from moving into the empty space between the lead vehicle and the follow vehicle.

20 Claims, 7 Drawing Sheets

Computing Component 600

Hardware Processors 602 

Machine-Readable Storage Media 604

Receiving Data from a Sensor of a Set of Vehicles, wherein the Set of Vehicles comprises a Lead Vehicle and a Follow Vehicle Following the Lead Vehicle at a Towing Distance 606

Determining an Entity is Potential to Intervene between the Set of Vehicles 608

Determining the Obstacle is Performing an Action to Intervene between the Set of Vehicles 610

Performing a Countermeasure from the Set of Vehicles to the Obstacle to Prevent the Obstacle from Intervening between the Set of Vehicles 612

FIG. 6

HITCHLESS TOWING SYSTEM FOR PREDICTING AND COMPENSATING FOR AN INTERVENING OBSTACLE

TECHNICAL FIELD

The present disclosure relates generally to the field of advanced driver-assistance systems (ADAS), and more particularly some implementations relate to systems and methods for improving the performance of hitchless towing by predicting and compensating for intervening vehicles.

BACKGROUND OF THE INVENTION

Vehicles may be used as a means of transportation for the public. Vehicles may include automobiles, trucks, motorcycles, bicycles, scooters, mopeds, recreational vehicles and other like on- or off-road vehicles. Vehicles may further include autonomous, semi-autonomous and manual vehicles. As useful as vehicles are for transportation, there may be times when vehicles are inoperable. A vehicle may be inoperable for any number of reasons, including running out of gas, dead battery, misplaced keys, flat tire(s), engine problems, damage to one or more components of the vehicle, etc.

Vehicles, whether operable or inoperable, may need to be towed to transport it from one location to another. Towing may be the act of pulling or hauling a vehicle, typically by the use of proper towing equipment, such as a rope, cable, hitch, tow bars, couplings, chains, etc. that is attached to another vehicle. With the use of autonomous and semi-autonomous vehicles, the typical methods of towing may be substituted with hitchless towing. Hitchless towing may be the act of towing a vehicle by having the vehicle follow another vehicle without any type of physical connection. However, current programs of hitchless towing have difficulty with accurately evaluating and preventing intervening obstacles, such as other vehicles, from interfering with the hitchless towing configuration between two vehicles.

BRIEF SUMMARY OF THE DISCLOSURE

According to various aspects of the disclosed technology, systems and methods for identifying and preventing an intervening obstacle between a set of vehicles in a hitchless towing configuration are provided.

In accordance with some implementations, a method for identifying and preventing an intervening obstacle between a set of vehicles in a hitchless towing configuration is provided. The method may include: receiving data from a sensor of the set of vehicles, wherein the set of vehicles may include a lead vehicle and a follow vehicle following the lead vehicle at a towing distance; determining an obstacle is potential to intervene between the set of vehicles; determining the obstacle is performing an action to intervene between the set of vehicles; and performing a countermeasure from the set of vehicles to the obstacle to prevent the obstacle from intervening between the set of vehicles.

In some applications, the sensor may be located on either the leading vehicle or the following vehicle.

In some applications, the sensor may include at least one of a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

In some applications, the action to intervene may include at least one of a turn signal, moving towards the set of vehicles, accelerating, decelerating and braking.

In some applications, the countermeasure may include at least one of flashing lights, shining projections, playing sounds, sending an alert, decreasing the towing distance between the set of vehicles, increasing the speed of the set of vehicles, decreasing the speed of the set of vehicles and redirecting the set of vehicles to a new path.

In some applications, the performing the countermeasure from the set of vehicles to the obstacle may include: determining the obstacle comprises a device; determining the device receives communication from an external system; and sending a message to the device, wherein the message may include a notification that the set of vehicles are in the hitchless towing configuration and the obstacle is directed to intervene.

In some applications, the countermeasure performed may be adjusted according to a hazard level of the obstacle to intervene between the set of vehicles and the hazard level may be determined by the action performed by the obstacle.

In some applications, the method may further include: determining the obstacle is intervening between the set of vehicles; and performing a second countermeasure from the set of vehicles to the intervening obstacle to reestablish the hitchless towing configuration.

In another aspect, a system for identifying and preventing an intervening obstacle between a set of vehicles in a hitchless towing configuration is provided that may include one or more processors; and memory coupled to the one or more processors to store instructions, which when executed by the one or more processors, may cause the one or more processors to perform operations. The operations may include: receiving data from a sensor of the set of vehicles, wherein the set of vehicles may include a lead vehicle and a follow vehicle following the lead vehicle at a towing distance; determining an obstacle is potential to intervene between the set of vehicles; determining the obstacle is performing an action to intervene between the set of vehicles; and performing a countermeasure from the set of vehicles to the obstacle to prevent the obstacle from intervening between the set of vehicles.

In some applications, the sensor may be located on either the leading vehicle or the following vehicle.

In some applications, the sensor may include at least one of a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

In some applications, the action to intervene may include at least one of a turn signal, moving towards the set of vehicles, accelerating, decelerating and braking.

In some applications, the countermeasure may include at least one of flashing lights, shining projections, playing sounds, sending an alert, decreasing the towing distance between the set of vehicles, increasing the speed of the set of vehicles, decreasing the speed of the set of vehicles and redirecting the set of vehicles to a new path.

In some applications, the performing the countermeasure from the set of vehicles to the obstacle may include: determining the obstacle comprises a device; determining the device receives communication from an external system; and sending a message to the device, wherein the message may include a notification that the set of vehicles are in the hitchless towing configuration and the obstacle is directed to intervene.

In some applications, the countermeasure performed may be adjusted according to a hazard level of the obstacle to intervene between the set of vehicles and the hazard level may be determined by the action performed by the obstacle.

In some applications, the system may further include operations comprising: determining the obstacle is intervening between the set of vehicles; and performing a second countermeasure from the set of vehicles to the intervening obstacle to reestablish the hitchless towing configuration.

In another aspect, a non-transitory machine-readable medium is provided. The non-transitory computer-readable medium may include instructions that when executed by a processor may cause the processor to perform operations including: receiving data from a sensor of the set of vehicles, wherein the set of vehicles comprises a lead vehicle and a follow vehicle following the lead vehicle at a towing distance; determining, based on the data, an obstacle is potential to intervene between the set of vehicles; determining, based on the data, the obstacle is performing an action to intervene between the set of vehicles; and performing a countermeasure from the set of vehicles to the obstacle to prevent the obstacle from intervening between the set of vehicles.

In some applications, the sensor may be located on either the leading vehicle or the following vehicle.

In some applications, the sensor may include at least one of a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

In some applications, the action to intervene may include at least one of a turn signal, moving towards the set of vehicles, accelerating, decelerating and braking.

In some applications, the countermeasure may include at least one of flashing lights, shining projections, playing sounds, sending an alert, decreasing the towing distance between the set of vehicles, increasing the speed of the set of vehicles, decreasing the speed of the set of vehicles and redirecting the set of vehicles to a new path.

In some applications, the performing the countermeasure from the set of vehicles to the obstacle may include: determining the obstacle comprises a device; determining the device receives communication from an external system; and sending a message to the device, wherein the message may include a notification that the set of vehicles are in the hitchless towing configuration and the obstacle is directed to intervene.

In some applications, the countermeasure performed may be adjusted according to a hazard level of the obstacle to intervene between the set of vehicles and the hazard level may be determined by the action performed by the obstacle.

In some applications, the non-transitory machine-readable medium may further include operations comprising: determining the obstacle is intervening between the set of vehicles; and performing a second countermeasure from the set of vehicles to the intervening obstacle to reestablish the hitchless towing configuration.

Other features and aspects of the disclosed technology will become apparent from the following detailed description, taken in conjunction with the accompanying drawings, which illustrate, by way of example, the features in accordance with applications of the disclosed technology. The summary is not intended to limit the scope of any inventions described herein, which are defined solely by the claims attached hereto.

BRIEF DESCRIPTION OF THE DRAWINGS

The present disclosure, in accordance with one or more various applications, is described in detail with reference to the following figures. The figures are provided for purposes of illustration only and merely depict typical or example applications.

FIG. 6 is an example illustration of a computing component that includes one or more hardware processors and machine-readable storage media storing a set of machine-readable/machine-executable instructions that, when executed, cause the one or more hardware processors to perform an illustrative method of identifying and preventing an intervening obstacle between a set of vehicles in a hitchless towing configuration, according to example embodiments described in the present disclosure.

Figure 1:
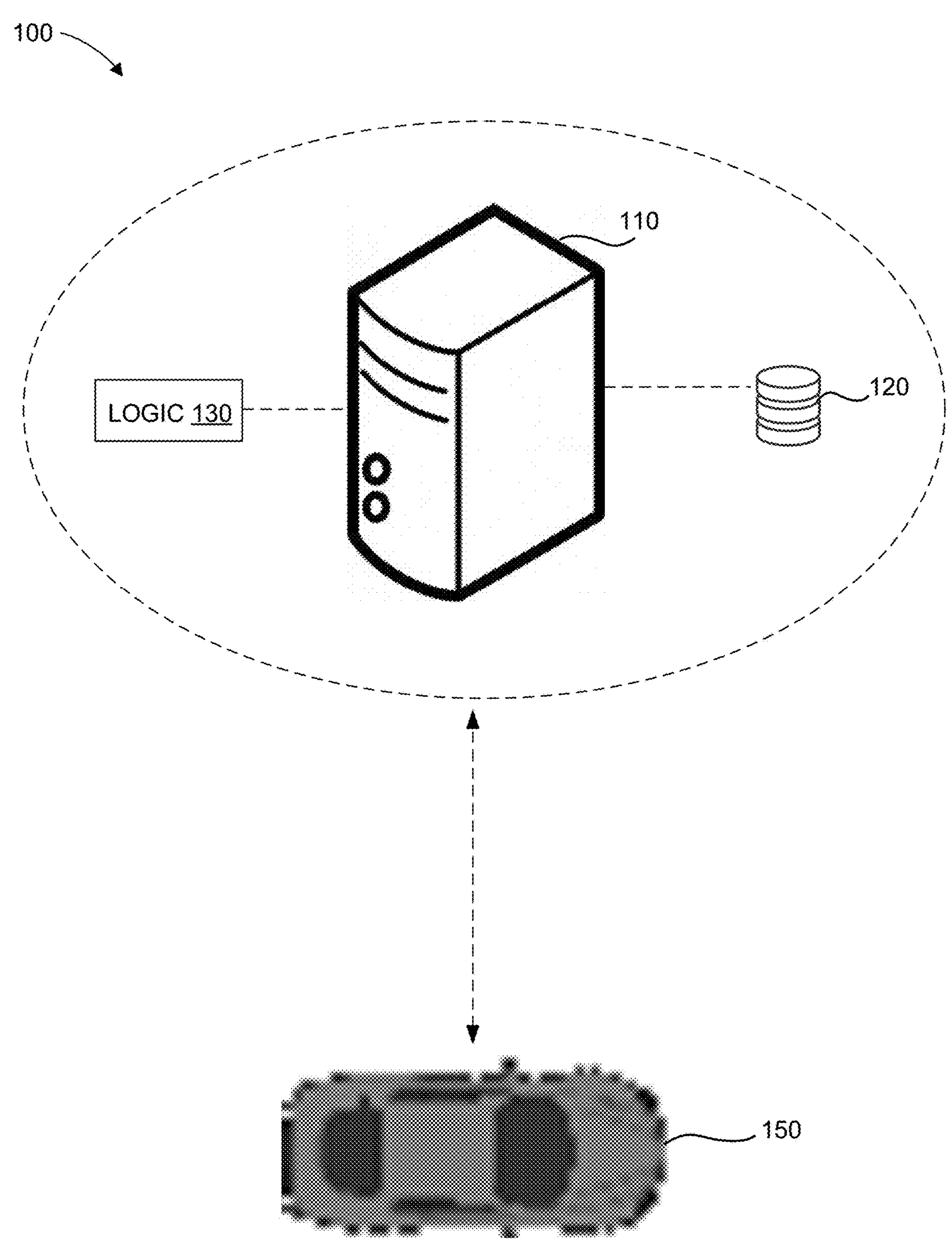
FIG. 1 is an example illustration of a computing system that performs identifying and preventing an intervening obstacle between a set of vehicles in a hitchless towing configuration, according to example applications described in the present disclosure.

The figures are not exhaustive and do not limit the present disclosure to the precise form disclosed.

DETAILED DESCRIPTION

As described above, vehicles may be used as a means of transportation for the public. Vehicles may include automobiles, trucks, motorcycles, bicycles, scooters, mopeds, recreational vehicles and other like on- or off-road vehicles. Vehicles may further include autonomous, semi-autonomous and manual vehicles. Vehicles, whether operable or inoperable, may need to be towed to transport it from one location to another. For autonomous and semi-autonomous vehicles, the typical methods of towing may be substituted with hitchless towing. Hitchless towing may be the act of towing a vehicle by having the vehicle follow another vehicle without any type of physical connection. It may be important for hitchless towing systems to accurately evaluate and prevent intervening obstacles, such as other vehicles, from interfering with the hitchless towing configuration between two vehicles to ensure there are no issues with the connectivity of the hitchless towing. Current programs of hitchless towing systems are not equipped to accurately evaluate and prevent intervening obstacles, which may cause issues with the performance of hitchless towing.

Aspects of the technology disclosed herein may provide systems and methods configured to identify and prevent an intervening obstacle from interfering with a set of vehicles in a hitchless towing configuration. A intervening obstacle detection and response system may use sensors and algorithms to accurately determine an obstacle is performing an action to intervene with the set of vehicles, or is currently intervening with the set of vehicles, which may be used to accurately determine a countermeasure to perform to prevent or remove an intervening vehicle. In particular, aspects of the systems and methods disclosed herein may be configured to determine potentially intervening obstacles, actions of an obstacles that may cause the obstacle to intervene, and countermeasures to be performed to maintain or reestablish a hitchless towing configuration between a set of vehicles.

A set of vehicles may be in a hitchless towing configuration. The set of vehicles may include a first vehicle being a lead vehicle and a second vehicle being a follow vehicle. The lead vehicle may be the vehicle of the set in the front position of the hitchless towing configuration, where the lead vehicle is guiding the follow vehicle. The follow vehicle may be the vehicle of the set in the end position of the hitchless towing configuration, where the follow vehicle is being guided by the lead vehicle. The lead vehicle may be an autonomous, semi-autonomous or manual vehicle. The follow vehicle may be an autonomous or semi-autonomous vehicle. The lead vehicle and follow vehicle may include systems that allow communication between the set to allow both vehicles to be connected in a hitchless towing configuration and travel in a coordinated and synchronous manner.

Each of the lead vehicle and follow vehicle of the set of vehicles may include one or more sensors. The sensors may include, for example, a camera, image sensor, radar sensor, light detection and ranging (LIDAR) sensor, position sensor, audio sensor, infrared sensor, microwave sensor, optical sensor, haptic sensor, magnetometer, communication system and global positioning system (GPS). Data may be received by at least a sensor of the lead vehicle or a sensor of the follow vehicle. At least one sensor of the set of vehicles may receive data, wherein the data may include information of objects surrounding the set of vehicles, such as other vehicles, traffic signs, pedestrians, light poles, debris and other objects. Data received by a sensor of one vehicle may be shared with the other vehicle.

The data received by a sensor of the set of vehicles may be analyzed. Analyzing the data may determine an obstacle is potential to intervene between the set of vehicles. The obstacle may be an object surrounding the set of vehicles, such as a pedestrian, another vehicle, including an automobiles, trucks, motorcycles, bicycles, scooters, mopeds, recreational vehicles and other like on- or off-road vehicles, debris and other objects. The obstacle may be potential to intervene between the set of vehicles when it is located in a position that is in close proximity to the set of vehicles. Close proximity may be when the distance between the obstacle and at least one vehicle of the set of vehicles is within an obstacle distance threshold.

When an obstacle has been determined to be potential to intervene between the set of vehicles, the data may be further analyzed to determine if the obstacle is performing an action that may cause the obstacle to actually intervene between the set of vehicles. An action of the obstacle to intervene between the set of vehicles may include having a turn signal on in the direction of the set of vehicles, moving towards the set of vehicles, accelerating in the direction of the set of vehicles, decelerating in the direction of the set of vehicles, braking ahead of the set of vehicles, etc. An obstacle may be determined to potentially intervene between the set of vehicles, but may not actually intervene if an action to intervene is not being performed. For example, an obstacle of another vehicle may be in close proximity to the set of vehicles where the obstacle is driving next to the follow vehicle of the set. The obstacle may be determined to be potential to intervene between the set of vehicles. The obstacle may continue to drive next to the follow vehicle of the set in the same direction as the set of vehicles, and not perform any action that may be analyzed as an action to intervene, such as initiating a turn signal, turning towards the set of vehicles, etc.

Determining, based on the data, an obstacle is performing an action to intervene between the set of vehicles may result in a countermeasure being performed to prevent the obstacle from intervening between the set of vehicles. The countermeasure may include at least one of flashing lights, shining projections, playing sounds, sending an alert, decreasing the towing distance between the set of vehicles, increasing the speed of the set of vehicles, decreasing the speed of the set of vehicles and redirecting the set of vehicles to a new path. The countermeasure may be performed by either or both the lead vehicle and the follow vehicle of the set of vehicles to the obstacle.

Performing the countermeasure may further include determining if the obstacle includes a device. When the obstacle includes a device, it may be further determined if the device receives communication from an external system. If it is determined the device of the obstacle can receive external communication from an external system, the countermeasure performed may include sending a message to the device of the obstacle. The message may include a notification that the set of vehicles are in a hitchless towing configuration. The message may include a notification that the obstacle is directed to intervene between the set of vehicles in a hitchless towing configuration. The message may include a notification of suggestive actions that the obstacle may take to avoid intervening between the set of vehicles. The message may be displayed on a GUI of the device. The message may be sent from either or both of the lead vehicle and follow vehicle. The message may be sent from a system external to the intervening obstacle detection and response systems of both the lead vehicle and the follow vehicle, which each vehicle's intervening obstacle detection and response system may be able to communicate to. Many variations are possible.

The countermeasure may be performed by the set of vehicles to the obstacle as a means to alert the obstacle that the set of vehicles is in a hitchless towing configuration. The countermeasure may be a means to discourage and prevent the obstacle from intervening between the set of vehicles. The countermeasure may be performed using at least one component of either or both the lead vehicle and follow vehicle. The countermeasure performed by the set of vehicles may be adjusted according to a hazard level of the obstacle to intervene between the set of vehicles. The hazard level of the obstacle to intervene may be based on the action to intervene performed by the obstacle. If it is determined an obstacle is successful in intervening between the set of vehicles, a second countermeasure may be performed to remove the intervening obstacle and reestablish the hitchless towing configuration between the set of vehicles. One or more countermeasures may be performed until it is determined there are no obstacles performing actions to intervene and no intervening obstacles, and the set of vehicles connected in the hitchless towing configuration.

The intervening obstacle detection and response system of each of the set of vehicles may display the analysis of the data received by a sensor and the countermeasures determined to be performed on a Graphical User Interface (GUI). An external system interconnected to one or both of the intervening obstacle detection and response systems of the set of vehicles may also display the analysis of the data received by a sensor and the countermeasures determined to be performed on a GUI. Countermeasures may be displayed on a GUI of a device of an intervening obstacle.

It should be noted that the terms "accurate," "accurately," and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example of a computing system 100 which may be internal or otherwise associated within a vehicle 150. In some embodiments, the computing system 100 may be a machine learning (ML) pipeline and model, and use ML algorithms. In some examples, the vehicle 150 may be a vehicle, such as an automobile, truck, motorcycle, bicycle, scooter, moped, recreational vehicle and other like on- or off-road vehicles. The vehicle 150 may input data into computing component 110. The computing component 110 may perform one or more available operations on the input data to generate outputs, such as identifying intervening obstacles and performing countermeasures. The vehicle 150 may further display the outputs on a Graphical User Interface (GUI). The GUI may be in vehicle 150 or on a computing device, such as a desktop computer, a laptop, a mobile phone, a tablet device, an Internet of Things (IoT) device, etc. The GUI may display the outputs as a two dimensional (2D) and three dimensional (3D) layout and map showing the various outputs generated by algorithms, such as ML algorithms, based on various input data, such as sensor data of intervening obstacles from vehicle 150.

The computing system 110 in the illustrated example may include one or more processors and logic 130 that implements instructions to carry out the functions of the computing component 110, for example, receiving data from a sensor of the set of vehicles, determining an obstacle is potential to intervene between the set of vehicles, determining the obstacle is performing an action to intervene between the set of vehicles, and performing a countermeasure from the set of vehicles to the obstacle to prevent the obstacle from intervening between the set of vehicles. The computing component 110 may store, in a database 120, details regarding scenarios or conditions in which some algorithms, image datasets, and assessments are performed and used to determine intervening obstacles and perform countermeasures to prevent intervening obstacles from interfering between a set of vehicles in a hitchless towing configuration. An intervening obstacle may be interfering when it disrupts the hitchless towing configuration of the set of vehicles and potentially causes a connectivity issue, including, for example, getting between the set of vehicles and causing the set of vehicles to be farther apart than what is set in the hitchless towing configuration. Some of the scenarios or conditions will be illustrated in the subsequent figures.

A processor may include one or more GPUs, CPUs, microprocessors or any other suitable processing system. Each of the one or more processors may include one or more single core or multicore processors. The one or more processors may execute instructions stored in a non-transitory computer readable medium. Logic 130 may contain instructions (e.g., program logic) executable by the one or more processors to execute various functions of computing component 110. Logic 130 may contain additional instructions as well, including instructions to transmit data to, receive data from, and interact with vehicle 150.

ML can refer to methods that, through the use of algorithms, are able to automatically extract intelligence or rules from training data sets and capture the same in informative models. In turn, those models are capable of making predictions based on patterns or inferences gleaned from subsequent data input into a trained model. According to implementations of the disclosed technology, the ML algorithm comprises, among other aspects, algorithms implementing a Gaussian process and the like. The ML algorithms disclosed herein may be supervised and unsupervised depending on the implementation. The ML algorithms may emulate the observed characteristics and components of vehicles, drivers and pedestrians to better evaluate and determine intervening obstacles to accurately perform countermeasures to prevent intervening obstacles from interfering between a set of vehicles in a hitchless towing configuration.

Although one example computing system 110 is illustrated in FIG. 1, in various embodiments multiple computing systems 110 can be included. Additionally, one or more systems and subsystems of computing system 100 can include its own dedicated or shared computing component 110, or a variant thereof. Accordingly, although computing system 100 is illustrated as a discrete computing system, this is for ease of illustration only, and computing system 100 can be distributed among various systems or components. The computing component 110 may be, for example, the computing system 210 of FIG. 2, the intervening obstacle detection and response system 300 of FIG. 3, the intervening obstacle detection and response system 400 of FIG. 4, the intervening obstacle detection and response system 500 of FIG. 5, the computing component 600 of FIG. 6 and the computing component 700 of FIG. 7.

Figure 2:
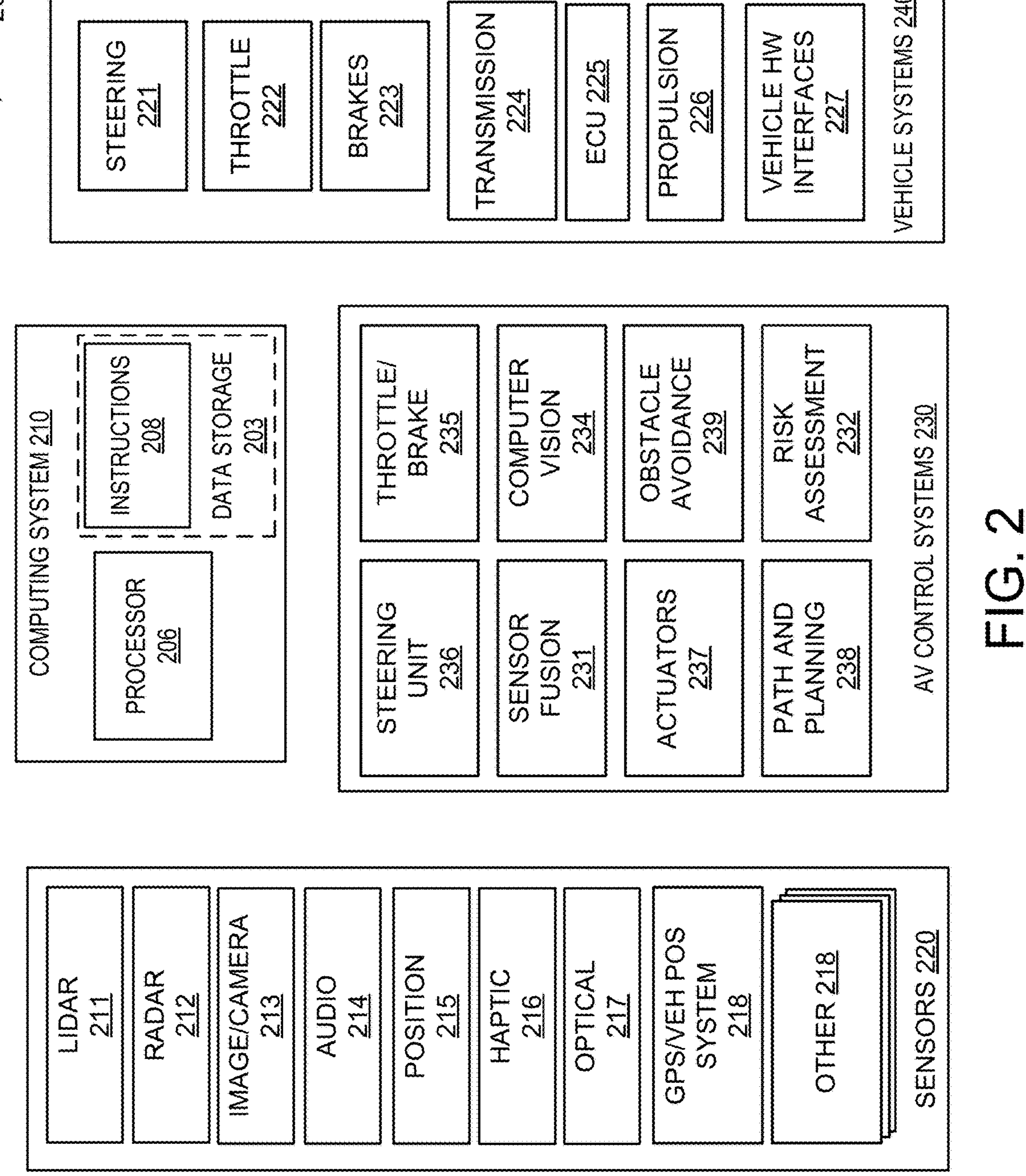
FIG. 2 is an example illustration of a vehicle with which applications of the disclosed technology may be implemented.

FIG. 2 illustrates an example connected vehicle 200, such as an autonomous, semi-autonomous or manual vehicle, with which applications of the disclosed technology may be implemented. As described herein, vehicle 200 can refer to a vehicle, such as an automobile, truck, motorcycle, bicycle, scooter, moped, recreational vehicle and other like on- or off-road vehicles, that may include an autonomous, semi-autonomous and manual operation. The vehicle 200 may include components, such as a computing system 210, sensors 220, AV control systems 230 and vehicle systems 240. Either of the computing system 210, sensors 220, AV control systems 230, and vehicle systems 230 can be part of an automated vehicle system/advanced driver assistance system (ADAS). ADAS can provide navigation control signals (e.g. control signals to actuate the vehicle and operate one or more vehicle systems 240 as shown in FIG. 2) for the vehicle to navigate a variety of situations. As used herein, ADAS can be an autonomous vehicle control system adapted for any level of vehicle control and driving autonomy. For example, the ADAS can be adapted for level 1, level 2, level 3, level 4, and level 5 autonomy (according to SAE standard). ADAS can allow for control mode blending (i.e. blending of autonomous and assisted control modes with human driver control). ADAS can correspond to a real-time machine perception system for vehicle actuation in a multi-vehicle environment. Vehicle 200 may include a greater or fewer quantity of systems and subsystems and each could include multiple elements. Accordingly, one or more of the functions of the technology disclosed herein may be divided into additional functional or physical components, or combined into fewer functional or physical components. Additionally, although the systems and subsystems illustrated in FIG. 2 are shown as being partitioned in a particular way, the functions of vehicle 200 can be partitioned in other ways. For example, various vehicle systems and subsystems can be combined in different ways to share functionality.

Sensors 220 may include a plurality of different sensors to gather data regarding vehicle 200, its operator, its operation and its surrounding environment. Although various sensors are shown, it can be understood that systems and methods for detecting and responding to intervening obstacles may not require many sensors. It can also be understood that system and methods described herein can be augmented by sensors off the vehicle 200. In this example, sensors 220 include light detection and ranging (LiDAR) sensor 211, radar sensor 212, image sensors 213 (i.e., a camera), audio sensors 214, position sensor 215, haptic sensor 216, optical sensor 217, a Global Positioning System (GPS) or other vehicle positioning system 218, and other like distance measurement and environment sensing sensors 219. One or more of the sensors 220 may gather data and send that data to the vehicle ECU or other processing unit. Sensors 220 (and other vehicle components) may be duplicated for redundancy.

Distance measuring sensors such as LiDAR sensor 211, radar sensor 212, IR sensors and other like sensors can be used to gather data to measure distances and closing rates to various external objects such as other vehicles, traffic signs, pedestrians, light poles and other objects. Image sensors 213 can include one or more cameras or other image sensors to capture images of the environment around the vehicle as well as internal to the vehicle. Information from image sensors 213 (e.g., camera) can be used to determine information about the environment surrounding the vehicle 200 including, for example, information regarding other objects surrounding vehicle 200. For example, image sensors 213 may be able to recognize specific vehicles (e.g. color, vehicle type), landmarks or other features (including, e.g., street signs, traffic lights, etc.), slope of the road, lines on the road, curbs, objects to be avoided (e.g., other vehicles, pedestrians, bicyclists, etc.) and other landmarks or features. Information from image sensors 213 can be used in conjunction with other information such as map data, or information from positioning system 218 to determine, refine, or verify vehicle (ego vehicle or another vehicle) location as well as detect potentially intervening obstacles.

Vehicle positioning system 218 (e.g., GPS or other positioning system) can be used to gather position information about a current location of the vehicle as well as other positioning or navigation information, such as the positioning information about a current location and direction of movement of a surrounding vehicle.

Other sensors 219 may be provided as well. Other sensors 219 can include vehicle acceleration sensors, vehicle speed sensors, wheelspin sensors (e.g. one for each wheel), a tire pressure monitoring sensor (e.g. one for each tire), vehicle clearance sensors, left-right and front-rear slip ratio sensors, and environmental sensors (e.g. to detect weather, traction conditions, or other environmental conditions). Other sensors 219 can be further included for a given implementation of ADAS. Various sensors 220, such as other sensors 219 may be used to provide input to computing system 210 and other systems of vehicle 200 so that the systems have information useful to operate establish and maintain a hitchless towing configuration between two vehicles.

AV control systems 230 may include a plurality of different systems/subsystems to control operation of vehicle 200. In this example, AV control systems 230 can include, autonomous driving module (not shown), steering unit 236, throttle and brake control unit 235, sensor fusion module 231, computer vision module 234, path and planning module 238, obstacle avoidance module 239, risk assessment module 232 and actuator(s) 237. Sensor fusion module 231 can be included to evaluate data from a plurality of sensors, including sensors 220. Sensor fusion module 231 may use computing system 210 or its own computing system to execute algorithms to assess inputs from the various sensors.

Throttle and brake control unit 235 can be used to control actuation of throttle and braking mechanisms of the vehicle to accelerate, slow down, stop or otherwise adjust the speed of the vehicle. For example, the throttle unit can control the operating speed of the engine or motor used to provide motive power for the vehicle. Likewise, the brake unit can be used to actuate brakes (e.g., disk, drum, etc.) or engage regenerative braking (e.g., such as in a hybrid or electric vehicle) to slow or stop the vehicle.

Steering unit 236 may include any of a number of different mechanisms to control or alter the heading of the vehicle. For example, steering unit 236 may include the appropriate control mechanisms to adjust the orientation of the front or rear wheels of the vehicle to accomplish changes in direction of the vehicle during operation. Electronic, hydraulic, mechanical or other steering mechanisms may be controlled by steering unit 236.

Computer vision module 234 may be included to process image data (e.g., image data captured from image sensors 213, or other image data) to evaluate the environment within or surrounding the vehicle. For example, algorithms operating as part of computer vision module 234 can evaluate still or moving images to determine features and landmarks (e.g., road signs, traffic lights, lane markings and other road boundaries, etc.), obstacles (e.g., pedestrians, bicyclists, other vehicles, other obstructions in the path of the subject vehicle) and other objects. The system can include video tracking and other algorithms to recognize objects such as the foregoing, estimate their speed, map the surroundings, and so on. Computer vision module 234 may be able to model the road traffic vehicle network, predict incoming hazards and obstacles, predict road hazard, and determine one or more contributing factors to identifying intervening obstacles. Computer vision module 234 may be able to perform depth estimation, image/video segmentation, camera localization, and object classification according to various classification techniques (including by applied neural networks).

Path and planning module 238 may be included to compute a desired path for vehicle 200 based on input from various other sensors and systems. For example, path and planning module 238 can use information from positioning system 218, sensor fusion module 231, computer vision module 234, obstacle avoidance module 239 (described below) and other systems (e.g. AV control systems 230, sensors 220, and vehicle systems 240) to determine a safe path to navigate the vehicle along a segment of a desired route. Path and planning module 238 may also be configured to dynamically update the vehicle path as real-time information is received from sensors 220 and other control systems 230.

Obstacle avoidance module 239 can be included to determine control inputs necessary to avoid and prevent intervening obstacles detected by sensors 220 or AV control systems 230. Obstacle avoidance module 239 can work in conjunction with path and planning module 238 to determine an appropriate path to avoid and prevent a detected intervening obstacle.

Path and planning module 238 (either alone or in conjunction with one or more other module of AV Control system 230, such as obstacle avoidance module 239, computer vision module 234, and sensor fusion module 231) may also be configured to perform and coordinate one or more vehicle maneuvers. Example vehicle maneuvers can include at least one of a path tracking, stabilization and collision avoidance maneuver. In connected vehicles, such as vehicles in a hitchless towing configuration, vehicle maneuvers can be performed at least partially cooperatively between the connected vehicles.

Vehicle systems 240 may include a plurality of different systems/subsystems to control operation of vehicle 200. In this example, vehicle systems 240 include steering system 221, throttle system 222, brakes 223, transmission 224, electronic control unit (ECU) 225, propulsion system 226 and vehicle hardware interfaces 227. The vehicle systems 240 may be controlled by AV control systems 230 in autonomous, semi-autonomous or manual mode of vehicle 200. For example, in autonomous or semi-autonomous mode, AV control systems 230, alone or in conjunction with other systems, can control vehicle systems 240 to operate the vehicle in a fully or semi-autonomous fashion. When control is assumed, computing system 210 and AV control system 230 can provide vehicle control systems to vehicle hardware interfaces for controlled systems such as steering angle 221, brakes 223, throttle 222, or other hardware interfaces 227, such as traction force, turn signals, horn, lights, etc. This may also include an assist mode in which the vehicle takes over partial control or activates ADAS controls (e.g. AC control systems 230) to assist the driver with vehicle operation.

Computing system 210 in the illustrated example includes a processor 206, and memory 203. Some or all of the functions of vehicle 200 may be controlled by computing system 210. Processor 206 can include one or more GPUs, CPUs, microprocessors or any other suitable processing system. Processor 206 may include one or more single core or multicore processors. Processor 206 executes instructions 208 stored in a non-transitory computer readable medium, such as memory 203.

Memory 203 may contain instructions (e.g., program logic) executable by processor 206 to execute various functions of vehicle 200, including those of vehicle systems and subsystems. Memory 203 may contain additional instructions as well, including instructions to transmit data to, receive data from, interact with, and control one or more of the sensors 220, AV control systems 230 and vehicle systems 240. In addition to the instructions, memory 203 may store data and other information used by the vehicle and its systems and subsystems for operation, including operation of vehicle 200 in the autonomous, semi-autonomous or manual modes. For example, memory 203 can include data that has been communicated to the ego vehicle (e.g. via V2V communication), mapping data, a model of the current or predicted road traffic vehicle network, vehicle dynamics data, computer vision recognition data, and other data which can be useful for the execution of one or more vehicle maneuvers, for example by one or more modules of the AV control systems 230.

Although one computing system 210 is illustrated in FIG. 2, in various applications multiple computing systems 210 can be included. Additionally, one or more systems and subsystems of vehicle 200 can include its own dedicated or shared computing system 210, or a variant thereof. Accordingly, although computing system 210 is illustrated as a discrete computing system, this is for ease of illustration only, and computing system 210 can be distributed among various vehicle systems or components.

Vehicle 200 may also include a (wireless or wired) communication system (not illustrated) to communicate with other vehicles, infrastructure elements, cloud components and other external entities using any of a number of communication protocols including, for example, V2V, V2I (vehicle-to-infrastructure) and V2X (vehicle-to-everything) protocols. Such a wireless communication system may allow vehicle 200 to receive information from other objects including, for example, map data, data regarding infrastructure elements, data regarding operation and intention of surrounding vehicles, and so on. A wireless communication system may allow vehicle 200 to receive updates to data that can be used to execute one or more vehicle control modes, and vehicle control algorithms as discussed herein. Wireless communication system may also allow vehicle 200 to transmit information to other objects and receive information from other objects (such as other vehicles, user devices, or infrastructure). In some applications, one or more communication protocol or dictionaries can be used, such as the SAE J2735 V2X Communications Message Set Dictionary. In some applications, the communication system may be useful in retrieving and sending one or more data useful in identifying and preventing intervening obstacles, as disclosed herein.

Communication system can be configured to receive data and other information from sensors 220 that is used in determining whether and to what extent control mode blending should be activated. Additionally, communication system can be used to send an activation signal or other activation information to various vehicle systems 240 and AV control systems 230 as part of controlling the vehicle. For example, communication system can be used to send signals to one or more of the vehicle actuators 237 to control parameters, for example, maximum steering angle, throttle response, vehicle braking, torque vectoring, and so on.

In some applications, computing functions for various applications disclosed herein may be performed entirely on computing system 210, distributed among two or more computing systems 210 of vehicle 200, performed on a cloud-based platform, performed on an edge-based platform, or performed on a combination of the foregoing.

Path and planning module 238 can allow for executing one or more vehicle control mode(s), and vehicle control algorithms in accordance with various implementations of the systems and methods disclosed herein.

In operation, path and planning module 238 (e.g. by a driver intent estimation module, not shown) can receive information regarding human control input used to operate the vehicle. As described above, information from sensors 220, actuators 237 and other systems can be used to determine the type and level of human control input. Path and planning module 238 can use this information to predict driver action. Path and planning module 238 can use this information to generate a predicted path and model the road traffic vehicle network. This may be useful in evaluating and determining intervening obstacles for a set of vehicles in a hitchless towing configuration. As also described above, information from sensors, and other systems can be used to evaluate and determine intervening obstacles. Eye state tracking, attention tracking, or intoxication level tracking, for example, can be used to estimate driver state. It can be understood that the driver state can contribute to evaluating and determining intervening obstacles as disclosed herein. Driver state can be provided to a risk assessment module 232 to determine the level of risk associated with a vehicle operation and determining an intervening obstacle. Although not illustrated in FIG. 2, where the assessed risk determines an intervening obstacle is present, a countermeasure may be performed to alert the vehicle 200 (e.g., audibly or visually) and the connected vehicle of the risk, and to alert the intervening obstacle of its interference with the hitchless towing configuration of the connected vehicles. Aspects of these warnings will be disclosed with reference to subsequent figures.

Path and planning module 238 can receive state information such as, for example from visibility maps, traffic and weather information, hazard maps, and local map views. Information from a navigation system can also provide a mission plan including maps and routing to path and planning module 238.

The path and planning module 238 (e.g. by a driver intent estimation module, not shown) can receive this information and predict behavior characteristics within a future time horizon. This information can be used by path and planning module 238 for executing one or more planning decisions. Planning decisions can be based on one or more policy (such as defensive driving policy). Planning decisions can be based on one or more level of autonomy, connected vehicle actions, one or more policy (such as defensive driving policy, cooperative driving policy, such as swarm or platoon formation, leader following, etc.). Path and planning module 238 can generate an expected model for the road traffic hazards and assist in creating a predicted traffic hazard level.

Path and planning module 238 can receive risk information from risk assessment module 232. Path and planning module 238 can receive vehicle capability and capacity information from one or more vehicle systems 240. Vehicle capability can be assessed, for example, by receiving information from vehicle hardware interfaces 227 to determine vehicle capabilities and identify a reachable set model. Path and planning module 238 can receive surrounding environment information (e.g. from computer vision module 234, and obstacle avoidance module 239). Path and planning module 238 can apply risk information and vehicle capability and capacity information to trajectory information (e.g. based on a planned trajectory and driver intent) to determine a safe or optimized trajectory for the vehicle given the drivers intent, policies (e.g. safety or vehicle cooperation policies), communicated information, and given one or more obstacles in the surrounding environment. This trajectory information can be provided to controller (e.g. ECU 225) to provide partial or full vehicle control in the event of an risk level above threshold. A signal from risk assessment module 232 can be used generate countermeasures described herein. A signal from risk assessment module 232 can trigger ECU 225 or another AV control system 230 to take over partial or full control of the vehicle.

Figure 3:
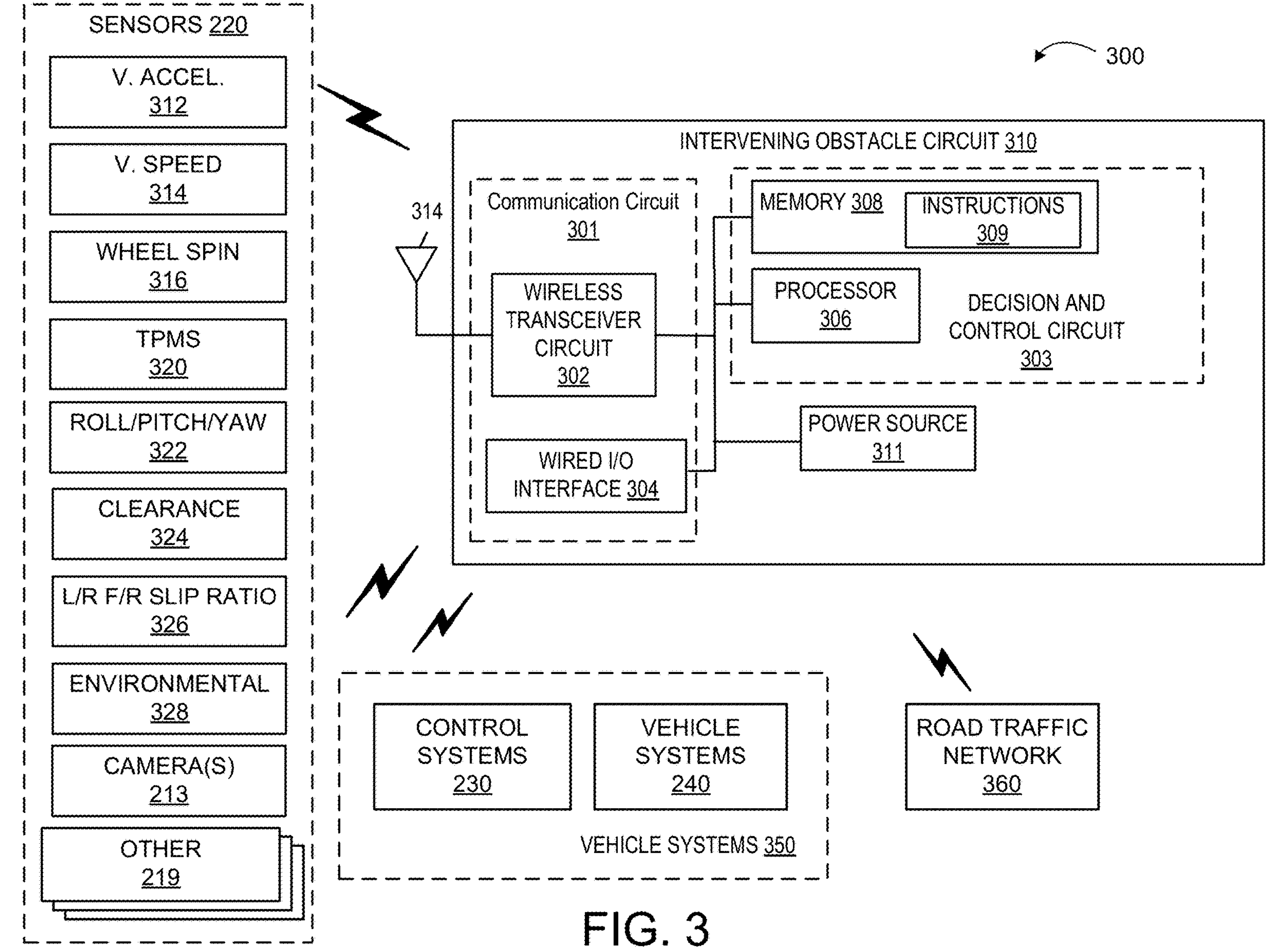
FIG. 3 is an example illustration of a system for detecting and responding to intervening obstacles of a set of vehicles in a hitchless towing configuration, according to example applications described in the present disclosure.

FIG. 3 illustrates an example architecture for detecting and responding to intervening obstacles described herein. Referring now to FIG. 3, in this example, a intervening obstacle detection and response system 300 includes an a intervening obstacle detection and response circuit 310, a plurality of sensors 220, and a plurality of vehicle systems 350. Also included are various elements of road traffic network 360 with which the a intervening obstacle detection and response system 300 can communicate. It can be understood that a road traffic network 360 can include various elements that are navigating and important in navigating a road traffic network, such as vehicles, pedestrians (with or without connected devices that can include aspects of intervening obstacle detection and response system 300 disclosed herein), or infrastructure (e.g. traffic signals, sensors, such as traffic cameras, databases, central servers, weather sensors). Other elements of the road traffic network 360 can include connected elements at workplaces, or the home (such as vehicle chargers, connected devices, appliances, etc.).

Intervening obstacle detection and response system 300 can be implemented as and include one or more components of the vehicle 200 shown in FIG. 2. Sensors 220, vehicle systems 350, and elements of road traffic network 360, can communicate with the a intervening obstacle detection and response circuit 310 via a wired or wireless communication interface. As previously alluded to, elements of road traffic network 360 can correspond to connected or unconnected devices, infrastructure (e.g. traffic signals, sensors, such as traffic cameras, weather sensors), vehicles, pedestrians, obstacles, etc. that are in a broad or immediate vicinity of ego-vehicle (e.g., vehicle 200) or otherwise important to the navigation of the road traffic network (such as remote infrastructure). Although sensors 220, vehicle systems 350, and road traffic network 360, are depicted as communicating with intervening obstacle detection and response circuit 310, they can also communicate with each other, as well as with other vehicle systems 350 and directly with element of a road traffic network 360. Data as disclosed herein can be communicated to and from the intervening obstacle detection and response circuit 310. For example, various infrastructure (example element of road traffic network 360) can include one or more databases, such as vehicle crash data or weather data. This data can be communicated to the circuit 310, and can such data can be updated based on outcomes for one or more maneuvers or navigation of the road traffic network, vehicle telematics, driver state (physical and mental), vehicle data from sensors 220 (e.g. tire pressure or brake status) from the vehicle. Similarly, traffic data, vehicle state data, time of travel, demographics data for drivers can be retrieved and updated. All of this data can be included in and contribute to predictive analytics (e.g., by machine learning) of accident possibility, and determinations of road hazard conditions and macro state levels. Similarly, models, circuits, and predictive analytics can be updated according to various outcomes.

Intervening obstacle detection and response circuit 310 can evaluate and detect an intervening obstacle as described herein, and generate countermeasures to prevent intervening obstacles from interfering with a hitchless towing configuration between two vehicles (such as alerts and control signals which will be described herein). As will be described in more detail herein, the determination of intervening obstacles can have one or more contributing factors. Various sensors 220, vehicle systems 350, and road traffic network 360 elements may contribute to gathering data for evaluating and determining intervening obstacles. For example, the intervening obstacle detection and response circuit 310 can include at least one of an intervening obstacle detection circuit and a countermeasure response circuit. The intervening obstacle detection and response circuit 310 can be implemented as an ECU or as part of an ECU such as, for example electronic control unit 225. In other applications, intervening obstacle detection and response circuit 310 can be implemented independently of the ECU, for example, as another vehicle system.

Intervening obstacle detection and response circuit 310 can be configured identify intervening obstacles, and appropriately respond. Intervening obstacle detection and response circuit 310 may include a communication circuit 301 (including either or both of a wireless transceiver circuit 302 with an associated antenna 314 and wired input/output (I/O) interface 304 in this example), a decision and control circuit 303 (including a processor 306 and memory 308 in this example) and a power source 311 (which can include power supply). It is understood that the disclosed intervening obstacle detection and response circuit 310 can be compatible with and support one or more standard or non-standard messaging protocols.

Components of intervening obstacle detection and response circuit 310 are illustrated as communicating with each other via a data bus, although other communication in interfaces can be included. Decision and control circuit 303 can be configured to control one or more aspects of intervening obstacle detection and response. Decision and control circuit 303 can be configured to execute one or more steps described with reference to FIG. 6.

Processor 306 can include a GPU, CPU, microprocessor, or any other suitable processing system. The memory 308 may include one or more various forms of memory or data storage (e.g., flash, RAM, etc.) that may be used to store the calibration parameters, images (analysis or historic), point parameters, instructions and variables for processor 306 as well as any other suitable information. Memory 308, can be made up of one or more modules of one or more different types of memory, and may be configured to store data and other information as well as operational instructions 309 that may be used by the processor 306 to execute one or more functions of intervening obstacle detection and response circuit 310. For example, data and other information can include vehicle driving data, such as a determined familiarity of the driver with driving and the vehicle. The data can also include values for signals of one or more sensors 220 useful in determining intervening obstacles and performing countermeasures. Operational instruction 309 can contain instructions for executing logical circuits, models, and methods as described herein.

Although the example of FIG. 3 is illustrated using processor and memory circuitry, as described below with reference to circuits disclosed herein, decision and control circuit 303 can be implemented utilizing any form of circuitry including, for example, hardware, software, or a combination thereof. By way of further example, one or more processors, controllers, ASICs, PLAS, PALs, CPLDs, FPGAs, logical components, software routines or other mechanisms might be implemented to make up an intervening obstacle detection and response circuit 310. Components of decision and control circuit 303 can be distributed among two or more decision and control circuits 303, performed on other circuits described with respect to intervening obstacle detection and response circuit 310, be performed on devices (such as cell phones) performed on a cloud-based platform (e.g. part of infrastructure), performed on distributed elements of the road traffic network 360, such as at multiple vehicles, user device, central servers, performed on an edge-based platform, and performed on a combination of the foregoing.

Communication circuit 301 may include either or both a wireless transceiver circuit 302 with an associated antenna 314 and a wired I/O interface 304 with an associated hardwired data port (not illustrated). As this example illustrates, communications with intervening obstacle detection and response circuit 310 can include either or both wired and wireless communications circuits 301. Wireless transceiver circuit 302 can include a transmitter and a receiver (not shown), e.g., a intervening obstacle broadcast mechanism, to allow wireless communications via any of a number of communication protocols such as, for example, WiFi (e.g. IEEE 802.11 standard), Bluetooth, near field communications (NFC), Zigbee, and any of a number of other wireless communication protocols whether standardized, proprietary, open, point-to-point, networked or otherwise. Antenna 314 is coupled to wireless transceiver circuit 302 and is used by wireless transceiver circuit 302 to transmit radio signals wirelessly to wireless equipment with which it is connected and to receive radio signals as well. These RF signals can include information of almost any sort that is sent or received by intervening obstacle detection and response circuit 310 to/from other components of the vehicle, such as sensors 220, vehicle systems 350, infrastructure (e.g. servers cloud based systems), and other devices or elements of road traffic network 360. These RF signals can include information of almost any sort that is sent or received by vehicle.

Wired I/O interface 304 can include a transmitter and a receiver (not shown) for hardwired communications with other devices. For example, wired I/O interface 304 can provide a hardwired interface to other components, including sensors 220, vehicle systems 350. Wired I/O interface 304 can communicate with other devices using Ethernet or any of a number of other wired communication protocols whether standardized, proprietary, open, point-to-point, networked or otherwise.

Power source 311 such as one or more of a battery or batteries (such as, e.g., Li-ion, Li-Polymer, NiMH, NiCd, NiZn, and NiH2, to name a few, whether rechargeable or primary batteries), a power connector (e.g., to connect to vehicle supplied power, another vehicle battery, alternator, etc.), an energy harvester (e.g., solar cells, piezoelectric system, etc.), or it can include any other suitable power supply. It is understood power source 311 can be coupled to a power source of the vehicle, such as a battery and alternator. Power source 311 can be used to power the intervening obstacle detection and response circuit 310.

Sensors 220 can include one or more of the previously mentioned sensors 220. Sensors 220 can include one or more sensors that may or not otherwise be included on a standard vehicle (e.g., vehicle 200) with which the intervening obstacle detection and response circuit 310 is implemented. In the illustrated example, sensors 220 include vehicle acceleration sensors 312, vehicle speed sensors 314, wheelspin sensors 316 (e.g., one for each wheel), a tire pressure monitoring system (TPMS) 320, accelerometers such as a 3-axis accelerometer 322 to detect roll, pitch and yaw of the vehicle, vehicle clearance sensors 324, left-right and front-rear slip ratio sensors 326, environmental sensors 328 (e.g., to detect weather, salinity or other environmental conditions), and camera(s) 213 (e.g. front rear, side, top, bottom facing). Additional sensors 219 can also be included as may be appropriate for a given implementation intervening obstacle detection and response system 300.

Vehicle systems 350 can include any of a number of different vehicle components or subsystems used to control or monitor various aspects of the vehicle and its performance. For example, it can include any or all of the aforementioned vehicle systems 240 and control systems 230 shown in FIG. 2. In this example, the vehicle systems 350 may include a GPS or other vehicle positioning system 218.

During operation, intervening obstacle detection and response circuit 310 can receive information from various vehicle sensors 220, vehicle systems 350, and road traffic network 360 to determine intervening obstacles. Also, the driver, owner, and operator of the vehicle may manually trigger one or more processes described herein for detecting an intervening obstacle. Communication circuit 301 can be used to transmit and receive information between the intervening obstacle detection and response circuit 310, sensors 220 and vehicle systems 350. Also, sensors 220 and intervening obstacle detection and response circuit 310 may communicate with vehicle systems 350 directly or indirectly (e.g., via communication circuit 301 or otherwise). Communication circuit 301 can be used to transmit and receive information between intervening obstacle detection and response circuit 310, one or more other systems of a vehicle 200, but also other elements of a road traffic network 360, such as vehicles, devices (e.g. mobile phones), systems, networks (such as a communications network and central server), and infrastructure.

In various applications, communication circuit 301 can be configured to receive data and other information from sensors 220 and vehicle systems 350 that is used in determining intervening obstacles. As one example, when data is received from a an element of road traffic network 360 (such as from a driver's user device), communication circuit 301 can be used to send an activation signal and activation information to one or more vehicle systems 350 or sensors 220 for the vehicle to provide certain responsive information as countermeasures. For example, it may be useful for vehicle systems 350 or sensors 220 to provide data useful in determining an intervening obstacle. Alternatively, intervening obstacle detection and response circuit 310 can be continuously receiving information from vehicle system 350, sensors 220, other vehicles, devices and infrastructure (e.g. those that are elements of road traffic network 360). Further, upon determination of an intervening obstacle, communication circuit 301 can send a signal to other components of the vehicle, infrastructure, or other elements of the road traffic network based on the determination of the intervening obstacle. For example, the communication circuit 301 can send a signal to a vehicle system 350 that indicates a control input for performing one or more countermeasures to prevent interference by the intervening obstacles according to a state of the intervening obstacle. In some applications upon detecting an intervening obstacle, depending on the determined state of the intervening obstacle, the driver's control of the vehicle can be prohibited, and control of the vehicle can be offloaded to the ADAS. In more specific examples, upon detection of an intervening obstacle (e.g., by sensors 220, and vehicle system 350 or by elements of the road traffic network 360), one or more signals can be sent to a vehicle system 350, so that an assist mode can be activated and the vehicle can control one or more of vehicle systems 240 (e.g., steering system 221, throttle system 222, brakes 223, transmission 224, ECU 225, propulsion system 226, suspension, and powertrain).

The examples of FIGS. 2 and 3 are provided for illustration purposes only as examples of vehicle 200 and intervening obstacle detection and response system 300 with which applications of the disclosed technology may be implemented. One of ordinary skill in the art reading this description will understand how the disclosed applications can be implemented with vehicle platforms.

Figure 4:
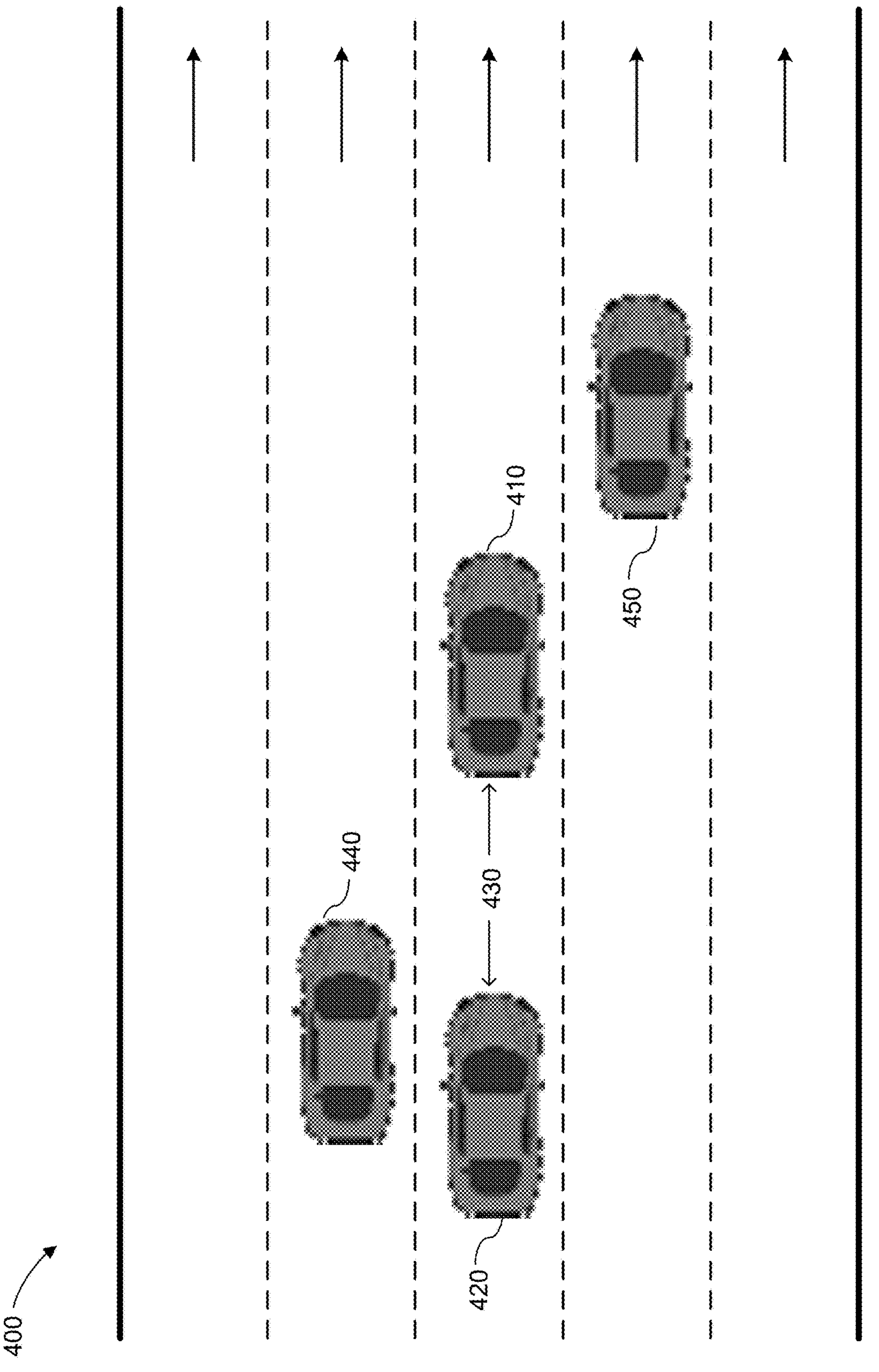
FIG. 4 is an example illustration of a system for detecting and responding to intervening obstacles of a set of vehicles in a hitchless towing configuration, according to example applications described in the present disclosure.

FIG. 4 illustrates an example intervening obstacle detection and response system 400. The intervening obstacle detection and response system 400 may be configured to identify and prevent an intervening obstacle from interfering with a set of vehicles in a hitchless towing configuration. Each vehicle of the set of vehicles may include a separate intervening obstacle detection and response system 400 where each vehicle's respective intervening obstacle detection and response system 400 may communicate to each other. The set of vehicles may each use the same intervening obstacle detection and response system 400. Many variations are possible.

The set of vehicles may include a first vehicle being a lead vehicle 410 and a second vehicle being a follow vehicle 420. The lead vehicle 410 may be the vehicle of the set in the front position of the hitchless towing configuration, where the lead vehicle 410 is guiding the follow vehicle 420. The follow vehicle 420 may be the vehicle of the set in the end position of the hitchless towing configuration, where the follow vehicle 420 is being guided by the lead vehicle 410. The lead vehicle 410 may be an autonomous, semi-autonomous or manual vehicle. The follow vehicle 420 may be an autonomous or semi-autonomous vehicle.

The lead vehicle 410 and follow vehicle 420 may include systems that allow communication between the set to allow both vehicles to be connected in a hitchless towing configuration and travel in a coordinated and synchronous manner. The intervening obstacle detection and response system 400 may have the lead vehicle 410 and the follow vehicle 420 in a hitchless towing configuration where the follow vehicle 420 may follow the driving actions of the lead vehicle 410. The intervening obstacle detection and response system 400 may have the lead vehicle 410 and the follow vehicle 420 in a hitchless towing configuration where the follow vehicle 420 may follow the lead vehicle 410 within a towing distance 430. The towing distance 430 may be preset. The towing distance 430 may be set according to input data received by the intervening obstacle detection and response system 400. The input data may be received by one or more sensors of either or both of the lead vehicle 410 and the follow vehicle 420. The input data may be received by one or more personnel. Many variations are possible.

Each of the lead vehicle 410 and the follow vehicle 420 of the set of vehicles may include one or more sensors. The sensors may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS). In one example, the sensors may include LiDAR sensor 211, radar sensor 212, image sensors 213 (i.e., a camera), audio sensors 214, position sensor 215, haptic sensor 216, optical sensor 217, a Global Positioning System (GPS) or other vehicle positioning system 218, and other like distance measurement and environment sensing sensors 219 of sensors 220 of FIG. 2. Data may be received by at least a sensor of the lead vehicle 410 or a sensor of the follow vehicle 420. At least one sensor of the set of vehicles may receive data, wherein the data may include information of objects surrounding either or both of the lead vehicle 410 and the follow vehicle 420 of the set of vehicles. Objects may include other vehicles, traffic signs, pedestrians, light poles and other objects. Data received by a sensor of one vehicle may be shared with the other vehicle via communication circuits, such as communication circuit 301 of FIG. 3.

The data received by a sensor of the set of vehicles may be analyzed. Analyzing the data may determine an obstacle is potential to intervene between the set of vehicles. The obstacle may be an object surrounding the set of vehicles, such as a pedestrian, another vehicle, including an automobiles, trucks, motorcycles, bicycles, scooters, mopeds, recreational vehicles and other like on- or off-road vehicles, debris and other objects surrounding the set of vehicles. The obstacle may be potential to intervene between the set of vehicles when it is located in a position that is in close proximity to the set of vehicles, such as vehicle 440 and vehicle 450. Close proximity may be when the distance between the obstacle and at least one vehicle of the set of vehicles is within an obstacle distance threshold.

When an obstacle, such as vehicle 440 and vehicle 450, has been determined to be potential to intervene between the set of vehicles, the data may be further analyzed to determine if the obstacle is performing an action that may cause the obstacle to actually intervene between the set of vehicles. An action of the obstacle to intervene between the set of vehicles may include having a turn signal on in the direction of the set of vehicles, moving towards the set of vehicles, accelerating in the direction of the set of vehicles, decelerating in the direction of the set of vehicles, braking ahead of the set of vehicles, etc. An obstacle may be determined to potentially intervene between the set of vehicles, but may not actually intervene if an action to intervene is not being performed. In one example, vehicle 450 may be determined to be an obstacle of the set of vehicles, as the vehicle 450 may be determined to be in close proximity to the lead vehicle 410. Vehicle 450 may be driving next to the lead vehicle 410, in the same direction along the road. The vehicle 450 may continue to drive next to and in the same direction as the lead vehicle 410 on the road, and may not perform any action that may be determined to be intervening with the hitchless towing configuration of the set of vehicles. The vehicle 450 may be determined to not be an intervening obstacle. In other example, vehicle 440 may be determined to be an obstacle of the set of vehicles, as the vehicle 450 may be determined to be in close proximity to the follow vehicle 420. Vehicle 440 may be driving next to the follow vehicle 420, in the same direction along the road. Vehicle 440 may perform one or more intervening actions, such as turning on its right turn signal, accelerating, driving towards the set of vehicles, turning the steering wheel right, having traveling directions active on one or more devices associated with the vehicle 440 with the traveling directions indicating that vehicle 440 is to traveling towards the right of the road, and so on. The intervening obstacle detection and response system 400 may determine vehicle 440 is performing one or more intervening actions that, individually or in combination, may indicate vehicle 440 is an intervening obstacle to the set of vehicles. The intervening obstacle detection and response system 400 may determine if one or more intervening actions are being performed by vehicle 440 by receiving data of vehicle 440 from one or more sensors of either or both the lead vehicle 410 and the follow vehicle 420.

Determining, based on the data, an obstacle is performing an intervening action to interfere with the hitchless towing configuration between the set of vehicles may result in a countermeasure being performed. The countermeasure performed may be used as a means to prevent the obstacle from intervening between the set of vehicles. The countermeasure may include at least one of flashing lights, shining projections, playing sounds, sending an alert, decreasing the towing distance between the set of vehicles, increasing the speed of the set of vehicles, decreasing the speed of the set of vehicles and redirecting the set of vehicles to a new path. The countermeasure may be performed by either or both the lead vehicle 410 and the follow vehicle 420 of the set of vehicles to the obstacle. The countermeasure may be performed using one or more components of either or both the lead vehicle 410 and the follow vehicle 420 of the set of vehicles, including, for example, lights, speakers, projectors, alarms, etc.

Performing the countermeasure may further include determining if the obstacle includes a communication circuit or a device. When the obstacle includes a communication circuit or a device, it may be further determined if the communication circuit or device receives communication from an external system. If it is determined the device of the obstacle can receive communication from an external system by means of the communication circuit or device, the countermeasure performed may include sending a message to the communication circuit or device of the obstacle. The message may include a notification that the set of vehicles are in a hitchless towing configuration. The message may include a notification that the obstacle is directed to intervene between the set of vehicles in a hitchless towing configuration. The message may include a notification of suggestive or affirmative actions that the obstacle may take to avoid intervening between the set of vehicles. For example, if vehicle 440 is determined to be an intervening obstacle and vehicle 440 is an autonomous vehicle with a communication circuit, the intervening obstacle detection and response system 400 may send instructions of affirmative actions that the vehicle 440 may use to override its current driving actions to avoid interfering with the hitchless towing configuration of the set of vehicles. The message may be sent from the intervening obstacle detection and response system 400. Many variations are possible.

In one example, the intervening obstacle detection and response system 400 may receive data of vehicle 440 from at least one or more sensors of follow vehicle 420. The intervening obstacle detection and response system 400 may analyze the data and determine vehicle 440 is in in close proximity to the follow vehicle 420. The intervening obstacle detection and response system 400 may further analyze the data and determine vehicle 440 is performing one or more intervening actions, such as turning on its right turn signal, accelerating, driving towards the set of vehicles, turning the steering wheel right, having traveling directions active on one or more devices associated with the vehicle 440 with the traveling directions indicating that vehicle 440 is to traveling towards the right of the road, and so on. The intervening obstacle detection and response system 400 may determine vehicle 440 includes a device, such as a mobile phone, that may receive communication from the intervening obstacle detection and response system 400. The intervening obstacle detection and response system 400 may perform a countermeasure of sending a message to the device of vehicle 440 that may include a notification that vehicle 440 is performing one or more intervening actions that may interfere with the hitchless towing configuration of the set of vehicles. The countermeasure message may be displayed on a GUI of the device of vehicle 440. The intervening obstacle detection and response system 400 may perform one or more additional countermeasures in conjunction with the countermeasure message, including, for example, flashing lights, shining projections, playing sounds and sending an alert to the vehicle 440.

The intervening obstacle detection and response system 400 may perform a countermeasure from the set of vehicles to the obstacle as a means to alert the obstacle that the set of vehicles is in a hitchless towing configuration. The intervening obstacle detection and response system 400 may perform a countermeasure as a means to discourage and prevent the obstacle from intervening between the set of vehicles. The countermeasure may be performed using at least one component of either or both the lead vehicle and follow vehicle. The countermeasure performed by the set of vehicles may be adjusted according to a hazard level of the obstacle to intervene between the set of vehicles. The intervening obstacle detection and response system 400 may determine the hazard level of the obstacle based on the intervening action performed by the obstacle. The hazard level of the obstacle based on the intervening action may be determined according to one or more factors, including, for example, characteristics of the set of vehicles, characteristics of the obstacle, characteristics of the environment, such as the road condition, surrounding objects, weather, etc. An intervening obstacle may be intervening or interfering when it disrupts the hitchless towing configuration of the set of vehicles and potentially causes a connectivity issue, including, for example, getting between the set of vehicles and causing the set of vehicles to be farther apart than what is set in the hitchless towing configuration. If it is determined an obstacle is successful in intervening between the set of vehicles, a second countermeasure may be performed to remove the intervening obstacle and reestablish the hitchless towing configuration between the set of vehicles. One or more countermeasures may be performed until it is determined there are no obstacles performing intervening actions to interfere with the hitchless towing configuration between the set of vehicles.

The intervening obstacle detection and response system 400 may display the analysis of the data received by a sensor and the countermeasures determined to be performed on a Graphical User Interface (GUI). The intervening obstacle detection and response system 400 may also display the analysis of the data received by a sensor and the countermeasures determined to be performed on a GUI of either or both of the lead vehicle 410 and the follow vehicle 420. The intervening obstacle detection and response system 400 may display countermeasures on a GUI of the intervening obstacle. The intervening obstacle detection and response system 400 may display countermeasures on a GUI of a device of an intervening obstacle. Many variations are possible.

Figure 5:
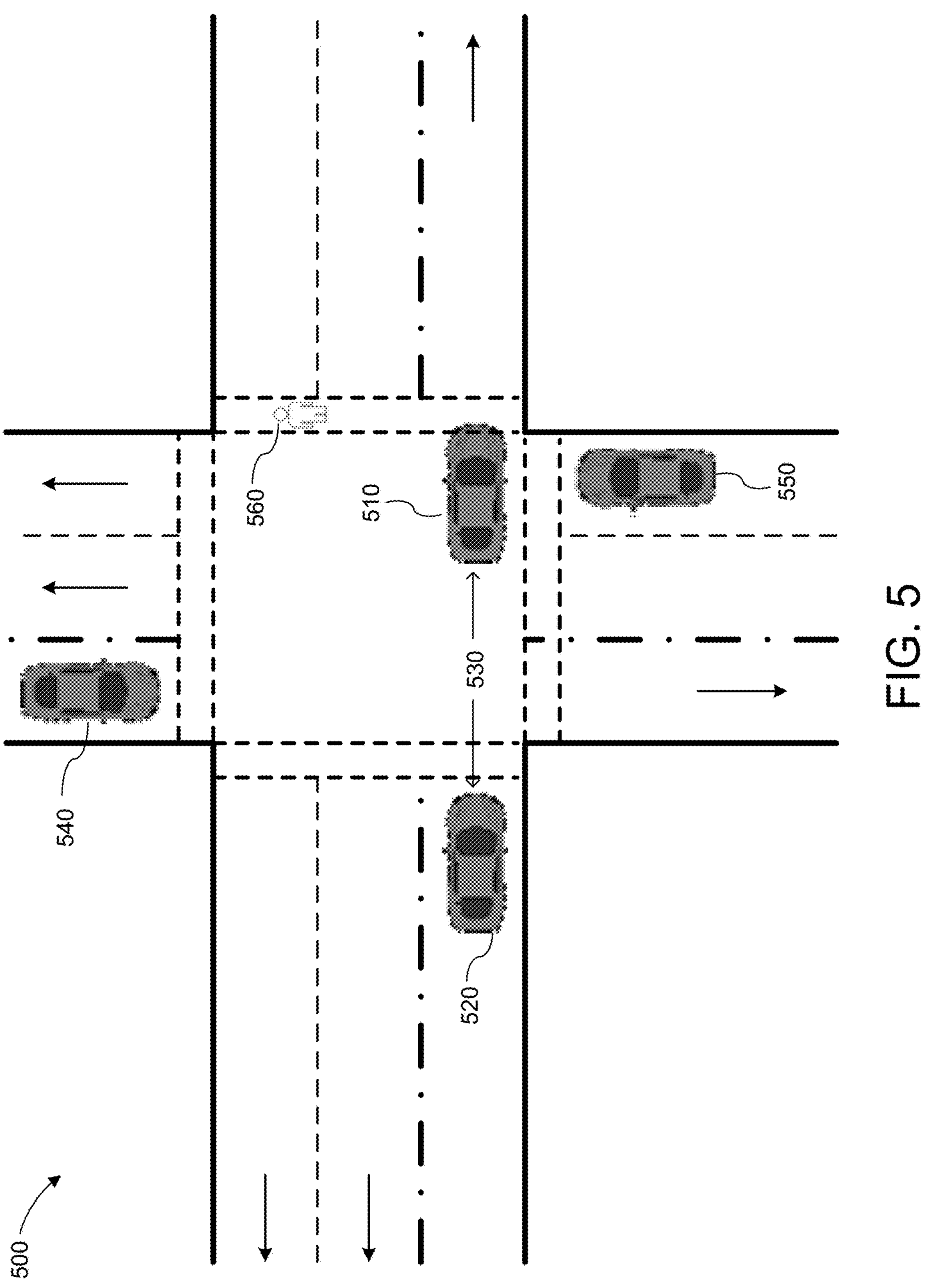
FIG. 5 is an example illustration of a system for detecting and responding to intervening obstacles of a set of vehicles in a hitchless towing configuration, according to example applications described in the present disclosure.
Figure 7:
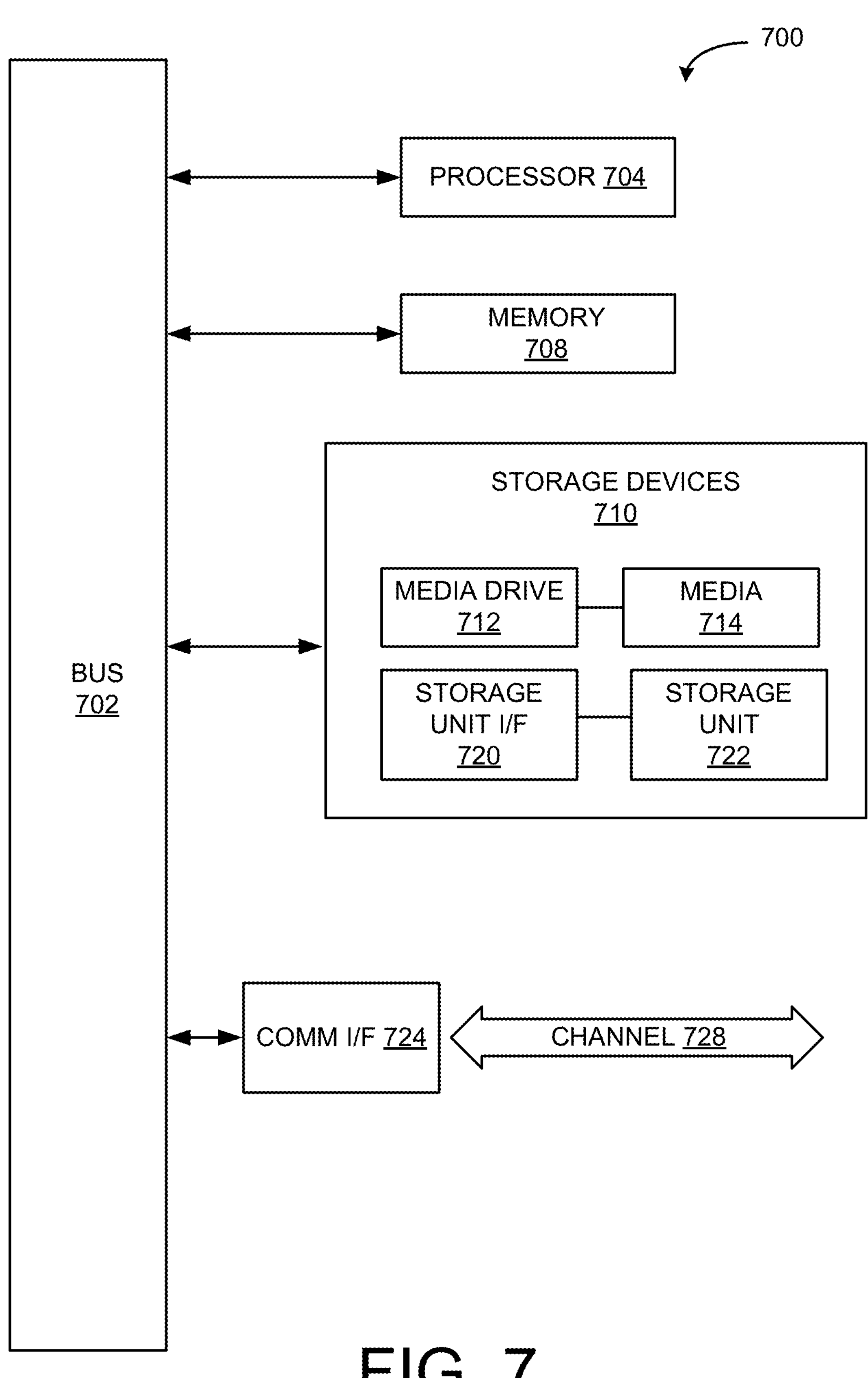
FIG. 7 is an example illustration of a computing component that may be used to implement various features of embodiments described in the present disclosure.

The intervening obstacle detection and response system 400 may be, for example, the computing component 110 of FIG. 1, the computing system 210 of FIG. 2, the intervening obstacle detection and response system 300 of FIG. 3, the intervening obstacle detection and response system 500 of FIG. 5, the computing component 600 of FIG. 6 and the computing component 700 of FIG. 7.

FIG. 5 illustrates an example intervening obstacle detection and response system 500. The intervening obstacle detection and response system 500 may be configured to identify and prevent an intervening obstacle from interfering with a set of vehicles in a hitchless towing configuration. Each vehicle of the set of vehicles may include a separate intervening obstacle detection and response system 500 where each vehicle's respective intervening obstacle detection and response system 500 may communicate to each other. The set of vehicles may each use the same intervening obstacle detection and response system 500. Many variations are possible.

The set of vehicles may include a first vehicle being a lead vehicle 510 and a second vehicle being a follow vehicle 520. The lead vehicle 510 may be the vehicle of the set in the front position of the hitchless towing configuration, where the lead vehicle 510 is guiding the follow vehicle 520. The follow vehicle 520 may be the vehicle of the set in the end position of the hitchless towing configuration, where the follow vehicle 520 is being guided by the lead vehicle 510. The lead vehicle 510 may be an autonomous, semi-autonomous or manual vehicle. The follow vehicle 520 may be an autonomous or semi-autonomous vehicle.

The lead vehicle 510 and follow vehicle 520 may include systems that allow communication between the set to allow both vehicles to be connected in a hitchless towing configuration and travel in a coordinated and synchronous manner. The intervening obstacle detection and response system 500 may have the lead vehicle 510 and the follow vehicle 520 in a hitchless towing configuration where the follow vehicle 520 may follow the driving actions of the lead vehicle 510. The intervening obstacle detection and response system 500 may have the lead vehicle 510 and the follow vehicle 520 in a hitchless towing configuration where the follow vehicle 520 may follow the lead vehicle 510 within a towing distance 530. The towing distance 530 may be preset. The towing distance 530 may be set according to input data received by the intervening obstacle detection and response system 500. The input data may be received by one or more sensors of either or both of the lead vehicle 510 and the follow vehicle 520. The input data may be received by one or more personnel. Many variations are possible.

Each of the lead vehicle 510 and the follow vehicle 520 of the set of vehicles may include one or more sensors. The sensors may include, for example, a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS). In one example, the sensors may include LiDAR sensor 211, radar sensor 212, image sensors 213 (i.e., a camera), audio sensors 214, position sensor 215, haptic sensor 216, optical sensor 217, a Global Positioning System (GPS) or other vehicle positioning system 218, and other like distance measurement and environment sensing sensors 219 of sensors 220 of FIG. 2. Data may be received by at least a sensor of the lead vehicle 510 or a sensor of the follow vehicle 520. At least one sensor of the set of vehicles may receive data, wherein the data may include information of objects surrounding either or both of the lead vehicle 510 and the follow vehicle 520 of the set of vehicles. Objects may include other vehicles, traffic signs, pedestrians, light poles and other objects. Data received by a sensor of one vehicle may be shared with the other vehicle via communication circuits, such as communication circuit 301 of FIG. 3.

The data received by a sensor of the set of vehicles may be analyzed. Analyzing the data may determine an obstacle is potential to intervene between the set of vehicles. The obstacle may be an object surrounding the set of vehicles, such as a pedestrian, another vehicle, including an automobiles, trucks, motorcycles, bicycles, scooters, mopeds, recreational vehicles and other like on- or off-road vehicles, debris and other objects surrounding the set of vehicles. The obstacle may be potential to intervene between the set of vehicles when it is located in a position that is in close proximity to the set of vehicles. Close proximity may be when the distance between the obstacle and at least one vehicle of the set of vehicles is within an obstacle distance threshold. The obstacle may be potential to intervene between the set of vehicles when it is analyzed by the intervening obstacle detection and response system 500 to be in a position directed towards the set of vehicles, such as vehicle 540, vehicle 550 and pedestrian 560.

When an object, such as vehicle 540, vehicle 550 and pedestrian 560, is determined to be an obstacle, the data may be further analyzed to determine if the obstacle is performing an intervening action that may cause the obstacle to actually interfere with the hitchless towing configuration between the set of vehicles. An intervening action of the obstacle may include, for example, having a turn signal on in the direction of the set of vehicles, moving towards the set of vehicles, accelerating in the direction of the set of vehicles, decelerating in the direction of the set of vehicles, braking ahead of the set of vehicles, etc., either individually or in combination. An object may be determined to be an obstacle, but may not be performing an intervening action.

In one example, vehicles 540 and 550 may be determined to be an obstacle of the set of vehicles, as the vehicles 540 and 550 may be determined to be directed towards the set of vehicles of the lead vehicle 510 and the follow vehicle 520. While vehicles 540 and 550 may be determined to be obstacles, both vehicles 540 and 550 may not be performing any actions that may be determined to be intervening with the hitchless towing configuration of the set of vehicles. The vehicles 540 and 550 may be determined to be driving straight in their respective lanes and directions, causing vehicles 540 and 550 to pass through and not get in between the lead vehicle 510 and the follow vehicle 520.

In other example, pedestrian 560 may be determined to be an obstacle of the set of vehicles, as the pedestrian 560 may be determined to be in close proximity and directed towards the lead vehicle 510. Pedestrian 560 may be walking across the street and determined by the intervening obstacle detection and response system 500 to get in between the set of vehicles as the follow vehicle 520 is following the lead vehicle 510. The intervening obstacle detection and response system 500 may determine pedestrian 560 is an intervening obstacles by receiving data of pedestrian 560 from one or more sensors of lead vehicle 510.

Determining, based on the data, an obstacle is performing an intervening action to interfere with the hitchless towing configuration between the set of vehicles may result in a countermeasure being performed. The countermeasure performed may be used as a means to prevent the obstacle from intervening between the set of vehicles. The countermeasure may include at least one of flashing lights, shining projections, playing sounds, sending an alert, decreasing the towing distance between the set of vehicles, increasing the speed of the set of vehicles, decreasing the speed of the set of vehicles and redirecting the set of vehicles to a new path. The countermeasure may be performed by either or both the lead vehicle 510 and the follow vehicle 520 of the set of vehicles to the obstacle. The countermeasure may be performed using one or more components of either or both the lead vehicle 510 and the follow vehicle 520 of the set of vehicles, including, for example, lights, speakers, projectors, alarms, etc.

Performing the countermeasure may further include determining if the obstacle includes a communication circuit or a device. When the obstacle includes a communication circuit or a device, it may be further determined if the communication circuit or device receives communication from an external system. If it is determined the device of the obstacle can receive communication from an external system by means of the communication circuit or device, the countermeasure performed may include sending a message to the communication circuit or device of the obstacle. The message may include a notification that the set of vehicles are in a hitchless towing configuration. The message may include a notification that the obstacle is directed to intervene between the set of vehicles in a hitchless towing configuration. The message may include a notification of suggestive or affirmative actions that the obstacle may take to avoid intervening between the set of vehicles. For example, if pedestrian 560 is determined to be an intervening obstacle and pedestrian 560 has a device in hand, the intervening obstacle detection and response system 500 may perform a countermeasure of sending a notification to the device of pedestrian 560 that the pedestrian 560 is directed to interfere with the hitchless towing configuration of the set of vehicles. The intervening obstacle detection and response system 500 may perform one or more additional countermeasures to pedestrian 560 using one or more components of either or both the lead vehicle 510 and the follow vehicle 520. Many variations are possible.

In one example, the intervening obstacle detection and response system 500 may receive data of pedestrian 560 from at least one or more sensors of the set of vehicles. The intervening obstacle detection and response system 500 may analyze the data and determine pedestrian 560 is in in close proximity to the lead vehicle 510. The intervening obstacle detection and response system 500 may further analyze the data and determine pedestrian 560 is performing one or more intervening actions, such as, for example, facing towards the location of the set of vehicles, walking towards the set of vehicles and having traveling directions active on a device associated with pedestrian 560 with the traveling directions indicating that pedestrian 560 is to traveling towards the position of the set of vehicles. The intervening obstacle detection and response system 500 may determine pedestrian 560 includes a device, such as a mobile phone, that may receive communication from the intervening obstacle detection and response system 500. The intervening obstacle detection and response system 500 may perform a countermeasure of sending a message to the device of pedestrian 560 that may include a notification that pedestrian 560 is performing one or more intervening actions that may interfere with the hitchless towing configuration of the set of vehicles. The countermeasure message may be displayed on a GUI of the device of pedestrian 560. The intervening obstacle detection and response system 500 may perform one or more additional countermeasures in conjunction with the countermeasure message, including, for example, flashing lights, shining projections, playing sounds and sending an alert to the pedestrian 560.

The intervening obstacle detection and response system 500 may perform a countermeasure from the set of vehicles to the obstacle as a means to alert the obstacle that the set of vehicles is in a hitchless towing configuration. The intervening obstacle detection and response system 500 may perform a countermeasure as a means to discourage and prevent the obstacle from intervening between the set of vehicles. The countermeasure may be performed using at least one component of either or both the lead vehicle and follow vehicle. The countermeasure performed by the set of vehicles may be adjusted according to a hazard level of the obstacle to intervene between the set of vehicles. The intervening obstacle detection and response system 500 may determine the hazard level of the obstacle based on the intervening action performed by the obstacle. The hazard level of the obstacle based on the intervening action may be determined according to one or more factors, including, for example, characteristics of the set of vehicles, characteristics of the obstacle, characteristics of the environment, such as the road condition, surrounding objects, weather, etc. If it is determined an obstacle is successful in intervening between the set of vehicles, a second countermeasure may be performed to remove the intervening obstacle and reestablish the hitchless towing configuration between the set of vehicles. One or more countermeasures may be performed until it is determined there are no obstacles performing intervening actions to interfere with the hitchless towing configuration between the set of vehicles.

The intervening obstacle detection and response system 500 may display the analysis of the data received by a sensor and the countermeasures determined to be performed on a Graphical User Interface (GUI). The intervening obstacle detection and response system 500 may also display the analysis of the data received by a sensor and the countermeasures determined to be performed on a GUI of either or both of the lead vehicle 510 and the follow vehicle 520. The intervening obstacle detection and response system 500 may display countermeasures on a GUI of the intervening obstacle. The intervening obstacle detection and response system 500 may display countermeasures on a GUI of a device of an intervening obstacle. Many variations are possible.

The intervening obstacle detection and response system 500 may be, for example, the computing component 110 of FIG. 1, the computing system 210 of FIG. 2, the intervening obstacle detection and response system 300 of FIG. 3, the intervening obstacle detection and response system 400 of FIG. 4, the computing component 600 of FIG. 6 and the computing component 700 of FIG. 7.

FIG. 6 illustrates an example computing component 600 that includes one or more hardware processors 602 and machine-readable storage media 604 storing a set of machine-readable/machine-executable instructions that, when executed, cause the hardware processor(s) 602 to perform an illustrative method of identifying and preventing an intervening obstacle between a set of vehicles in a hitchless towing configuration. It should be appreciated that there can be additional, fewer, or alternative steps performed in similar or alternative orders, or in parallel, within the scope of the various examples discussed herein unless otherwise stated. The computing component 600 may be implemented as the computing component 110 of FIG. 1, the computing system 210 of FIG. 2, the intervening obstacle detection and response system 300 of FIG. 3, the intervening obstacle detection and response system 400 of FIG. 4, the intervening obstacle detection and response system 500 of FIG. 5 and the computing component 700 of FIG. 7.

At step 606, the hardware processor(s) 602 may execute machine-readable/machine-executable instructions stored in the machine-readable storage media 604 to receive data from a sensor of a set of vehicles. The set of vehicles may include two vehicles in a hitchless towing configuration, with one vehicle of the set being a lead vehicle and the other vehicle of the set being a follow vehicle. The lead vehicle may be the vehicle of the set in the front position of the hitchless towing configuration, where the lead vehicle is guiding the follow vehicle. The follow vehicle may be the vehicle of the set in the end position of the hitchless towing configuration, where the follow vehicle is being guided by the lead vehicle. The lead vehicle may be an autonomous, semi-autonomous or manual vehicle. The follow vehicle may be an autonomous or semi-autonomous vehicle. The lead vehicle and follow vehicle may include systems that allow communication between the set to allow both vehicles to be connected in a hitchless towing configuration and travel in a coordinated and synchronous manner.

Each of the lead vehicle and follow vehicle of the set of vehicles may include one or more sensors. The sensors may include, for example, a camera, image sensor, radar sensor, light detection and ranging (LIDAR) sensor, position sensor, audio sensor, infrared sensor, microwave sensor, optical sensor, haptic sensor, magnetometer, communication system and global positioning system (GPS). Data may be received by at least both or either a sensor of the lead vehicle and a sensor of the follow vehicle. At least one sensor of the set of vehicles may receive data, wherein the data may include information of objects surrounding the set of vehicles, such as other vehicles, traffic signs, pedestrians, light poles and other objects.

At step 608, the hardware processor(s) 602 may execute machine-readable/machine-executable instructions stored in the machine-readable storage media 604 to determine an obstacle having a potential to intervene between the set of vehicles. The data received by a sensor of the set of vehicles may be analyzed. Analyzing the data may determine an obstacle having the potential to intervene between the set of vehicles. The obstacle may be an object surrounding the set of vehicles, such as a pedestrian, another vehicle, including an automobile, truck, motorcycle, bicycle, scooter, moped, recreational vehicle and other like on- or off-road vehicle, debris and other objects surrounding the set of vehicles. The obstacle may have the potential to intervene between the set of vehicles when it is located in a position that is in close proximity to the set of vehicles. Close proximity may be when the distance between the obstacle and at least one vehicle of the set of vehicles is within an obstacle distance threshold.

At step 610, the hardware processor(s) 602 may execute machine-readable/machine-executable instructions stored in the machine-readable storage media 604 to determine the obstacle is performing an action to intervene between the set of vehicles. After an obstacle has been determined to have the potential to intervene between the set of vehicles, the data may be further analyzed to determine if the obstacle is performing an action that may cause the obstacle to actually intervene between the set of vehicles. An action of the obstacle to intervene between the set of vehicles may include having a turn signal on in the direction of the set of vehicles, moving towards the set of vehicles, accelerating in the direction of the set of vehicles, decelerating in the direction of the set of vehicles, braking ahead of the set of vehicles, etc. An obstacle may be determined to potentially intervene between the set of vehicles, but may not actually intervene if an action to intervene is not being performed. For example, an obstacle of another vehicle may be in close proximity to the set of vehicles where the obstacle is driving next to either or both vehicles of the set. The obstacle may be determined to have potential to intervene between the set of vehicles. The obstacle may continue to drive next to a vehicle of the set in the same direction as the set of vehicles, and not perform any action that may be analyzed as an action to intervene, such as initiating a turn signal, turning towards the set of vehicles, etc.

At step 612, the hardware processor(s) 602 may execute machine-readable/machine-executable instructions stored in the machine-readable storage media 604 to perform a countermeasure from the set of vehicles to the obstacle to prevent the obstacle from intervening between the set of vehicles. Determining, based on the data, an obstacle is performing an action to intervene between the set of vehicles, a countermeasure may be performed to prevent the obstacle from intervening between the set of vehicles. The countermeasure may include, for example, at least one of flashing lights, shining projections, playing sounds (e.g., sounding a vehicle's horn), sending an alert, decreasing the towing distance between the set of vehicles, increasing the speed of the set of vehicles, decreasing the speed of the set of vehicles and redirecting the set of vehicles to a new path. The countermeasure may be performed by either or both the lead vehicle and the follow vehicle of the set of vehicles to the obstacle.

Performing the countermeasure may further include determining if the obstacle includes a device. When the obstacle does include a device, it may be further determined if the device receives communication from an external system. If it is determined the device of the obstacle can receive external communication from an external system, the countermeasure performed may include sending a message to the device of the obstacle. The message may include a notification that the set of vehicles are in a hitchless towing configuration. The message may include a notification that the obstacle should not intervene between the set of vehicles in a hitchless towing configuration. The message may include an audible or visual notification (or both) of suggestive actions that the obstacle may take to avoid intervening between the set of vehicles. A visual notification may be displayed on a GUI of the potentially intervening obstacle, such as a GUI of a device, an intervening vehicle's head unit or other display screen and so on. An audible notification may be played over the intervening vehicle's audio system or other speaker, over an occupants mobile device, over a pedestrian's mobile device, and so on. Many variations are possible. Where the intervening obstacle is an autonomous vehicle, the notification may include instructions that alter the behavior of the potentially intervening vehicle so that intervention does not occur. For example, the notification may cause the autonomous vehicle to cancel or delay an intended lane change operation. As another example, the notification may temporarily update the autonomous vehicle's stack so that the undesirable potential intervention operation is evaluated along with other rules or decision factors the autonomous vehicle is making at the time.

The countermeasure may be performed by the set of vehicles to the obstacle as a means to alert the obstacle that the set of vehicles is in a hitchless towing configuration. The countermeasure may be a means to discourage or prevent the obstacle from intervening between the set of vehicles. The countermeasure performed by the set of vehicles may be adjusted according to a hazard level of the obstacle to intervene between the set of vehicles. The hazard level of the obstacle to intervene may be based on the action to intervene performed by the obstacle. If it is determined an obstacle is successful in intervening between the set of vehicles, a second countermeasure may be performed to remove the intervening obstacle and reestablish the hitchless towing configuration between the set of vehicles. One or more countermeasures may be performed until it is determined there are no obstacles performing actions to intervene and no intervening obstacles, and the set of vehicles connected in the hitchless towing configuration.

As used herein, the terms circuit, system, and component might describe a given unit of functionality that can be performed in accordance with one or more applications of the present application. As used herein, a component might be implemented utilizing any form of hardware, software, or a combination thereof. For example, one or more processors, controllers, ASICS, PLAS, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software (such as user device applications described herein), these software elements can be implemented to operate with a computing or processing component capable of carrying out the functionality described with respect thereto. One such example computing component is shown in FIG. 7. Various applications are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a vehicle (e.g. vehicle 150, vehicle 200), user device, self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability. In another example, a computing component might be found in components making up vehicle 150, vehicle 200, user device, intervening obstacle detection and response circuit 310, decision and control circuit 303, computing system 100, computing system 210, ECU 225, etc.

Computing component 700 might include, for example, one or more processors, controllers, control components, or other processing devices. This can include a processor, and any one or more of the components making up vehicle 150 of FIG. 1, vehicle 200 of FIG. 2, computing system 210 of FIG. 2, intervening obstacle detection and response system 300 of FIG. 3, intervening obstacle detection and response system 400 of FIG. 4 and intervening obstacle detection and response system 500 of FIG. 5. Processor 704 might be implemented using a general-purpose or special-purpose processing engine such as, for example, a microprocessor, controller, or other control logic. The Processor 704 might be specifically configured to execute one or more instructions for execution of logic of one or more circuits described herein, such as intervening obstacle detection and response circuit 310, decision and control circuit 303, and logic for control systems 230. Processor 704 may be configured to execute one or more instructions for performing one or more methods, such as the method described in FIG. 6.

Processor 704 may be connected to a bus 702. However, any communication medium can be used to facilitate interaction with other components of computing component 700 or to communicate externally. In applications, processor 704 may fetch, decode, and execute one or more instructions to control processes and operations for enabling vehicle servicing as described herein. For example, instructions can correspond to steps for performing one or more steps of the method described in FIG. 6.

Computing component 700 might also include one or more memory components, simply referred to herein as main memory 708. For example, random access memory (RAM) or other dynamic memory, might be used for storing information and instructions to be fetched, decoded, and executed by processor 704. Such instructions may include one or more instructions for execution of one or more logical circuits described herein. Instructions can include instructions 208 of FIG. 2, and instructions 309 of FIG. 3 as described herein, for example. Main memory 708 might also be used for storing temporary variables or other intermediate information during execution of instructions to be fetched, decoded, and executed by processor 704. Computing component 700 might likewise include a read only memory ("ROM") or other static storage device coupled to bus 702 for storing static information and instructions for processor 704.

The computing component 700 might also include one or more various forms of information storage mechanism 710, which might include, for example, a media drive 712 and a storage unit interface 720. The media drive 712 might include a drive or other mechanism to support fixed or removable storage media 714. For example, a hard disk drive, a solid-state drive, a magnetic tape drive, an optical drive, a compact disc (CD) or digital video disc (DVD) drive (R or RW), or other removable or fixed media drive might be provided. Storage media 714 might include, for example, a hard disk, an integrated circuit assembly, magnetic tape, cartridge, optical disk, a CD or DVD. Storage media 714 may be any other fixed or removable medium that is read by, written to or accessed by media drive 712. As these examples illustrate, the storage media 714 can include a computer usable storage medium having stored therein computer software or data.

In alternative applications, information storage mechanism 710 might include other similar instrumentalities for allowing computer programs or other instructions or data to be loaded into computing component 700. Such instrumentalities might include, for example, a fixed or removable storage unit 722 and an interface 720. Examples of such storage unit 722 and interface 720 can include a program cartridge and cartridge interface, a removable memory (for example, a flash memory or other removable memory component) and memory slot. Other examples may include a PCMCIA slot and card, and other fixed or removable storage units 722 and interfaces 720 that allow software and data to be transferred from storage unit 722 to computing component 700.

Computing component 700 might also include a communications interface 724. Communications interface 724 might be used to allow software and data to be transferred between computing component 700 and external devices. Examples of communications interface 724 might include a modem or softmodem, a network interface (such as Ethernet, network interface card, IEEE 802.XX or other interface). Other examples include a communication port (such as for example, a USB port, IR port, RS232 port Bluetooth® interface, or other port), or other communications interface. Software/data transferred via communications interface 724 may be carried on signals, which can be electronic, electromagnetic (which includes optical) or other signals capable of being exchanged by a given communications interface 724. These signals might be provided to communications interface 724 via a channel 728. Channel 728 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 708, storage unit 722, media 714, and channel 728. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

As described herein, vehicles can be flying, partially submersible, submersible, boats, roadway, off-road, passenger, truck, trolley, train, drones, motorcycle, bicycle, or other vehicles. As used herein, vehicles can be any form of powered or unpowered transport. Obstacles can include one or more pedestrian, vehicle, animal, and other stationary or moving objects. Although roads are references herein, it is understood that the present disclosure is not limited to roads or to 1*d* or 2*d* traffic patterns.

The term "operably connected," "coupled", or "coupled to", as used throughout this description, can include direct or indirect connections, including connections without direct physical contact, electrical connections, optical connections, and so on.

The terms "a" and "an," as used herein, are defined as one or more than one. The term "plurality," as used herein, is defined as two or more than two. The term "another," as used herein, is defined as at least a second or more. The terms "including" and "having," as used herein, are defined as comprising (i.e. open language). The phrase "at least one of . . . and . . . " as used herein refers to and encompasses any and all possible combinations of one or more of the associated listed items. As an example, the phrase "at least one of A, B, or C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof. While various applications of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various applications be implemented to perform the recited functionality in the same order, and with each of the steps shown, unless the context dictates otherwise.

Although the disclosed technology is described above in terms of various exemplary applications and implementations, it should be understood that the various features, aspects and functionality described in one or more of the individual applications are not limited in their applicability to the particular application with which they are described, but instead can be applied, alone or in various combinations, to one or more of the other applications of the disclosed technology, whether or not such applications are described and whether or not such features are presented as being a part of a described application. Thus, the breadth and scope of the technology disclosed herein should not be limited by any of the above-described exemplary applications.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various applications set forth herein are described in terms of exemplary block diagrams, flow charts and other illustrations. As will become apparent to one of ordinary skill in the art after reading this document, the illustrated applications and their various alternatives can be implemented without confinement to the illustrated examples. For example, block diagrams and their accompanying description should not be construed as mandating a particular architecture or configuration.

What is claimed is:

1. A computer implemented method for identifying and addressing an intervening obstacle between a set of vehicles, the method comprising:

receiving data from at least one sensor of a lead vehicle or a follow vehicle in a hitchless towing configuration, the hitchless towing configuration comprising the follow vehicle following the lead vehicle without a physical connection between the lead vehicle and the follow vehicle, wherein an empty space exists between the lead vehicle and the follow vehicle;

determining, based on the data, an object is performing an action to move into the empty space between the lead vehicle and the follow vehicle; and causing the lead vehicle or the follow vehicle to perform a countermeasure to prevent the object from moving into the empty space between the lead vehicle and the follow vehicle, the countermeasure comprising a maneuver.

2. The method of claim 1, wherein causing the lead vehicle or the follow vehicle to perform the countermeasure comprises autonomously controlling the lead vehicle or the follow vehicle to perform the countermeasure.

3. The method of claim 1, wherein the at least one sensor comprises at least one of a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

4. The method of claim 1, wherein the object is another vehicle, and determining the object is performing the action to move into the empty space between the lead vehicle and the follow vehicle comprises determining the other vehicle is using a turn signal in a direction of the lead vehicle and the follow vehicle, the other vehicle is moving towards the lead vehicle and the follow vehicle, the other vehicle is accelerating in the direction of the direction of the lead vehicle and the follow vehicle, the other vehicle is decelerating in the direction of the direction of the lead vehicle and the follow vehicle, or the other vehicle is braking ahead of the lead vehicle and the follow vehicle.

5. The method of claim 1, wherein causing the lead vehicle or the follow vehicle to perform the countermeasure comprises causing the lead vehicle or the follow vehicle to decrease a towing distance between the lead vehicle and the follow vehicle, causing the lead vehicle or the follow vehicle to increase or decrease speed, or redirecting the lead vehicle and the follow vehicle to a new path.

6. The method of claim 1, wherein causing the lead vehicle or the follow vehicle to perform the countermeasure comprises:

determining the object comprises a communication device; and sending a notification to the communication device that the lead vehicle and the follow vehicle are in the hitchless towing configuration and the object should avoid moving into the empty space between the lead vehicle and the follow vehicle.

7. The method of claim 1, wherein the countermeasure performed is adjusted according to a hazard level of the object and the hazard level is determined by the action performed by the object to move into the empty space between the lead vehicle and the follow vehicle.

8. The method of claim 1, further comprising:

determining the object has moved into the empty space between the lead vehicle and the follow vehicle; and causing the lead vehicle or the follow vehicle to perform a second countermeasure to reestablish the hitchless towing configuration without the object between the lead vehicle and the follow vehicle.

9. A computing system for identifying and addressing an intervening obstacle between a set of vehicles, the computing system comprising:

one or more processors; and memory coupled to the one or more processors to store instructions, which when executed by the one or more processors, cause the one or more processors to perform operations, the operations comprising:

receiving data from at least one sensor of the set of a lead vehicle or a follow vehicle in a hitchless towing configuration, the hitchless towing configuration comprising the follow vehicle following the lead vehicle without a physical connection between the lead vehicle and the follow vehicle, wherein an empty space exists between the lead vehicle and the follow vehicle;

determining, based on the data, an object is performing an action to move into the empty space between the lead vehicle and the follow vehicle; and causing the lead vehicle or the follow vehicle to perform a countermeasure to prevent the object from moving into the empty space between the lead vehicle and the follow vehicle, the countermeasure comprising a maneuver.

10. The computing system of claim 9, wherein causing the lead vehicle or the follow vehicle to perform the countermeasure comprises autonomously controlling the lead vehicle or the follow vehicle to perform the countermeasure.

11. The computing system of claim 9, wherein the at least one sensor comprises at least one of a camera, image sensor, radar sensor, light detection and ranging (LiDAR) sensor, position sensor, audio sensor, infrared sensor, microwave sensor, optical sensor, haptic sensor, magnetometer, communication system and global positioning system (GPS).

12. The computing system of claim 9, wherein the object is another vehicle, and determining the object is performing the action to move into the empty space between the lead vehicle and the follow vehicle comprises determining the other vehicle is using a turn signal in a direction of the lead vehicle and the follow vehicle, the other vehicle is moving towards the lead vehicle and the follow vehicle, the other vehicle is accelerating in the direction of the direction of the lead vehicle and the follow vehicle, the other vehicle is decelerating in the direction of the direction of the lead vehicle and the follow vehicle, or the other vehicle is braking ahead of the lead vehicle and the follow vehicle.

13. The computing system of claim 9, wherein causing the lead vehicle or the follow vehicle to perform the countermeasure comprises causing the lead vehicle or the follow vehicle to decrease a towing distance between the lead vehicle and the follow vehicle, causing the lead vehicle or the follow vehicle to increase or decrease speed, or redirecting the lead vehicle and the follow vehicle to a new path.

14. The computing system of claim 9, wherein causing the lead vehicle or the follow vehicle to perform the countermeasure comprises:

determining the object comprises a communication device; and sending a notification to the communication device that the lead vehicle and the follow vehicle are in the hitchless towing configuration and the object should avoid moving into the empty space between the lead vehicle and the follow vehicle.

15. The computing system of claim 9, wherein the countermeasure performed is adjusted according to a hazard level of the object and the hazard level is determined by the action performed by the object to move into the empty space between the lead vehicle and the follow vehicle.

16. The computing system of claim 9, further comprising:

determining the object has moved into the empty space between the lead vehicle and the follow vehicle; and causing the lead vehicle or the follow vehicle to perform a second countermeasure to reestablish the hitchless towing configuration without the object between the lead vehicle and the follow vehicle.

17. A non-transitory machine-readable medium having instructions stored therein, which when executed by a processor, cause the processor to perform operations, the operations comprising:

receiving data from at least one sensor of a lead vehicle or a follow vehicle in a hitchless towing configuration, the hitchless towing configuration comprising the follow vehicle following the lead vehicle without a physical connection between the lead vehicle and the follow vehicle, wherein an empty space exists between the lead vehicle and the follow vehicle;

determining, based on the data, an object is performing an action to move into the empty space between the lead vehicle and the follow vehicle; and causing the lead vehicle or the follow vehicle to perform a countermeasure to prevent the object from moving into the empty space between the lead vehicle and the follow vehicle, the countermeasure comprising a maneuver.

18. The non-transitory machine-readable medium of claim 17, wherein causing the lead vehicle or the follow vehicle to perform the countermeasure comprises causing the lead vehicle or the follow vehicle to decrease a towing distance between the lead vehicle and the follow vehicle, causing the lead vehicle or the follow vehicle to increase or decrease speed, or redirecting the lead vehicle and the follow vehicle to a new path.

19. The non-transitory machine-readable medium of claim 17, wherein the countermeasure performed is adjusted according to a hazard level of the object and the hazard level is determined by the action performed by the object to move into the empty space between the lead vehicle and the follow vehicle.

20. The non-transitory machine-readable medium of claim 17, wherein the instructions cause the processor to perform the operations further comprising:

determining the object has moved into the empty space between the lead vehicle and the follow vehicle; and causing the lead vehicle or the follow vehicle to perform a second countermeasure to reestablish the hitchless towing configuration without the object between the lead vehicle and the follow vehicle.

* * * * *